(12) United States Patent
Hofer et al.

(10) Patent No.: US 11,227,410 B2
(45) Date of Patent: Jan. 18, 2022

(54) MULTI-CAMERA TRACKING

(71) Applicant: PELCO, Inc., Andover, MA (US)

(72) Inventors: Gregory V. Hofer, Loveland, CO (US); David K. Campbell, Loveland, CO (US); Kyminh Liang, Clovis, CA (US)

(73) Assignee: PELCO, INC., Fresno, CA (US)

( * ) Notice: Subject to any disclaimer, the term of this patent is extended or adjusted under 35 U.S.C. 154(b) by 131 days.

(21) Appl. No.: 16/366,382

(22) Filed: Mar. 27, 2019

(65) Prior Publication Data

US 2019/0306408 A1 Oct. 3, 2019

Related U.S. Application Data

(60) Provisional application No. 62/650,237, filed on Mar. 29, 2018.

(51) Int. Cl.
```
H04N 5/232    (2006.01)
G06K 9/00     (2006.01)
G06K 9/32     (2006.01)
G06T 7/70     (2017.01)
G08B 13/196   (2006.01)
```
(Continued)

(52) U.S. Cl.
CPC ............ *G06T 7/80* (2017.01); *G06K 9/00771* (2013.01); *G06K 9/3241* (2013.01); *G06T 7/292* (2017.01); *G06T 7/70* (2017.01); *G08B 13/19608* (2013.01); *G08B 13/19641* (2013.01); *H04N 5/23216* (2013.01); *H04N 5/23218* (2018.08); *H04N 5/23222* (2013.01); *H04N 5/23299* (2018.08); *H04N 5/247* (2013.01);
(Continued)

(58) Field of Classification Search
CPC .. G06T 7/80; G06T 7/292; G06T 7/70; G06T 2207/30232; G06T 7/33; G06T 7/85; G06T 2207/10012; G06T 2207/30244; G06K 9/00771; G06K 9/3241; G08B 13/19608; G08B 13/19641; H04N 5/23216; H04N 5/23218; H04N 5/23222; H04N 5/23299; H04N 5/247; H04N 7/181; H04N 13/30
See application file for complete search history.

(56) References Cited

U.S. PATENT DOCUMENTS 7,436,887 B2 * 10/2008 Yeredor ............. G06K 9/00771
                                                            375/240.01
2005/0134685 A1 * 6/2005 Egnal ..................... H04N 7/181
                                                            348/157
(Continued)

OTHER PUBLICATIONS

Paek et al. "Multiple-View Object Tracking Using Metadata." International Conference on Wavelet Analysis and Pattern Recognition, Nov. 2, 2007, pp. 12-170 (Year: 2007).*

(Continued)

*Primary Examiner* — Jon Chang
(74) *Attorney, Agent, or Firm* — Tutunjian & Bitetto, P.C.

(57) ABSTRACT

A method includes processing a video stream on at least one first camera device to identify actionable motion objects (AMOs). The at least one first camera device or computer system in communication therewith is caused to transmit metadata associated with the identified AMOs to at least one second camera device. A viewing area of the at least one second camera device is dynamically controlled in response to the metadata to enable the at least one second camera device to track and focus on at least one of the identified AMOs.

20 Claims, 25 Drawing Sheets

(51) Int. Cl.
*G06T 7/292* (2017.01)
*H04N 7/18* (2006.01)
*G06T 7/80* (2017.01)
*H04N 13/30* (2018.01)
*H04N 5/247* (2006.01)

(52) U.S. Cl.
CPC .............. *H04N 7/181* (2013.01); *H04N 13/30* (2018.05); *G06T 2207/30232* (2013.01)

(56) References Cited

U.S. PATENT DOCUMENTS

| | | | | |
|---|---|---|---|---|
| 2010/0141767 | A1* | 6/2010 | Mohanty | G08B 13/19643 348/159 |
| 2013/0100268 | A1* | 4/2013 | Mihailidis | G08B 21/0492 348/77 |
| 2013/0128050 | A1 | 5/2013 | Aghadasi et al. | |
| 2013/0162852 | A1* | 6/2013 | Boyle | H04N 5/222 348/211.99 |
| 2013/0208113 | A1* | 8/2013 | Yoneji | G08B 13/19608 348/143 |
| 2017/0309032 | A1* | 10/2017 | Holtz | H04N 5/23203 |

OTHER PUBLICATIONS

You et al. "A Cooperative Multi-Camera System for Tracking a Fast Moving Object." 4th Annual IEEE International Conference on Cyber Technology in Automation, Control and Intelligent Systems, Jun. 4, 2014, pp. 141-145 (Year: 2014).*

Product Datasheet for Axis Q6000-E MK II PTZ Dome Network Camera, Full 360 Degree overview with one-click PTZ control; Copyright 2016 Axis Communications AB. Axis Communications, Axis, ETRAX, ARTPEC and VAPIX.

* cited by examiner

Car 1 is detected from image captured by Camera 1

FIG. 10

Viewing area of Camera 2 is controlled to track and focus on Car 1 detected from Image captured by Camera 1

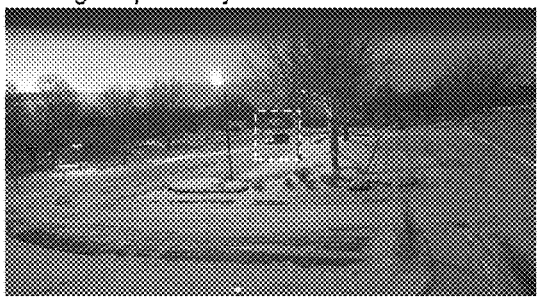

FIG. 11

Viewing area of Camera 2 is controlled to continue to follow Car 1 (now Parked) based on Image captured by Camera 1

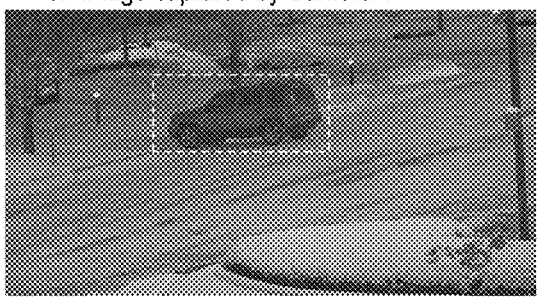

FIG. 12

Viewing area of Camera 2 is controlled to track Car 1 and newly detected Car 2 based on Image captured by Camera 1

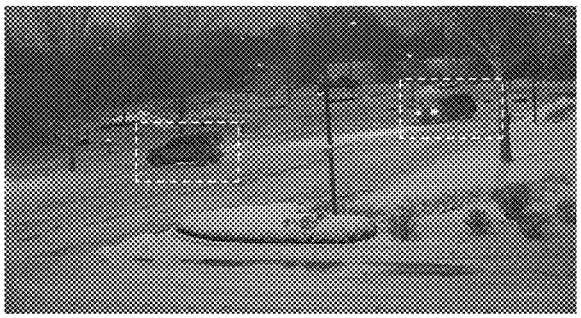

FIG. 13

Viewing area of Camera 2 is controlled to track Person 1 and Person 2 based on Image captured by Camera 1

FIG. 14

Camera 2 continues to track Person 1 and Person 2 based on Image captured by Camera 1

FIG. 15

MULTI-CAMERA TRACKING

CROSS-REFERENCE TO RELATED APPLICATIONS

The present application claims priority to U.S. Provisional Application Ser. No. 62/650,237 which was filed on Mar. 29, 2018 (CLO-0180-US-PSP) and is incorporated by reference herein in its entirety.

FIELD

This disclosure relates generally to camera devices, and more particularly, to systems and methods related to multi-camera tracking and to calibration of cameras used in multi-camera tracking.

BACKGROUND

Cameras are used in a variety of applications. One example application is in surveillance applications in which cameras are used to monitor indoor and outdoor locations. Networks of cameras may be used to monitor a given area, such as the internal and external portion (e.g., a parking lot) of a commercial building.

SUMMARY

Described herein are systems and methods related to multi-camera tracking and to calibration of camera devices used in multi-camera tracking. More particularly, in one aspect, a method according to the disclosure includes processing a video stream on at least one first camera device (or camera) to identify actionable motion objects (AMOs). The at least one first camera is caused to generate and transmit metadata associated with the identified AMOs to at least one second camera device (or camera). Additionally, a viewing area of the at least one second camera is dynamically controlled in response to the metadata to enable the at least one second camera to track and focus on (or monitor) at least one of the identified AMOs.

The method may include one or more of the following features either individually or in combination with other features. Dynamically controlling the viewing area of the at least one second camera device may include dynamically controlling pan-tilt-zoom (PTZ) motion of the at least one second camera device. The at least one first camera device may be mounted at a first location, and the at least one second camera device may be mounted at a second location that is different from the first location. The second location may be distal to the first location. In embodiments, a total viewing area of the at least one second camera device must overlap with at least a portion of a viewing area of the at least one first camera device. The total viewing area may correspond to a total viewing region that is accessible to the at least one second camera device, not just the viewing area that the at least one second camera device is directed to look at one point in time. The at least one first camera device may be (or include) a wide field of view camera. The wide field of view camera device may have a fixed viewing area. The at least one second camera device may be (or include) a pan tilt zoom camera.

The at least one of the identified AMOs tracked and focused on by the at least one second camera device may correspond to a physically largest object of the identified AMOs. The at least one of the identified AMOs tracked and focused on by the at least one second camera device may correspond to a fastest moving object of the identified AMOs. The at least one of the identified AMOs tracked and focused on by the at least one second camera device may correspond to a closest object of the identified AMOs to the at least one second camera device. The at least one of the identified AMOs tracked and focused on by the at least one second camera device may correspond to a farthest object of the identified AMOs to the at least one second camera device. It is understood that the at least one of the identified AMOs tracked and focused on by the at least one second camera device is not limited to the above-described object types. Rather, the at least one second camera device may track and focus on identified AMOs based on other object characteristics, such as type (car, person, etc.), color, etc.

In embodiments, analytic information from the at least one first camera device may be used to control the at least one second camera device. The at least one first camera device may be (or include) a wide field of view camera with fixed viewing. Additionally, the at least one second camera device may be (or include) a PTZ camera. The PTZ camera may be adjusted to zoom into a scene based on the identified AMOs size and/or speed and provide "extremely high" details. In embodiments, this process is completely automatic and operates without any manual control (e.g., user interaction).

A unique characteristic of this invention is that it provides auto tracking for the general case where (a) the at least one first camera device and the at least one second camera device are mounted at completely different locations, and (b) the at least one first camera device and the at least one second camera device provide different views of a scene. In embodiments, the invention provides an auto operator for the at least one second camera device to take advantage of the extreme magnification from the at least one second camera device, for example, without dedicating a user to control the at least one second camera device. For example, a video stream from the at least one first camera device may be processed and used to control pan, tilt, zoom motion of the at least one second camera device, thereby enabling the at least one second camera device to zoom in and provide a highly detail view of one or more actionable motion objects identified in the video stream.

In embodiments, the invention does not require that the at least one first camera device and the at least one second camera device be in a same housing and be located at a substantially same position. More particularly, in embodiments the invention works if the at least one first camera device and the at least one second camera device are mounted in a same position, or if the at least one first camera device and the at least one second camera device are "widely" separated. Additionally, in embodiments the invention works with existing cameras and, thus, does not require a "special" camera device, for example, in which at least one first camera device and at least one second camera device are provided in a same housing.

In embodiments, the invention does not require user interaction. More particularly, in embodiments the invention does not require a user to view video feed from the at least one first camera device, identify moving objects in the video feed, or control the at least one second camera device (e.g., with a mouse or joystick) to zoom into the scene. However, it is understood that in some embodiments user override provisions can be provided, for example, to select which one of the identified objects from the at least one first camera device's view to be tracked.

In embodiments, the invention provides a method for at least one first camera device to communicate with at least one second camera device, and for the at least one second camera device to receive metadata information describing analytic detection from the at least one first camera device. In some embodiments, the metadata information is received by the at least one second camera device directly from the at least one first camera device.

In embodiments, the at least one first camera device can perform AMO analytic detection and translate the AMO position to coordinates relative to the at least one second camera device and communicate these coordinates as move commands to the at least one second camera. In such embodiments, more of the processing functions have been moved from the at least one second camera device to the at least one first camera device. In other words, which camera does what does not have to be restricted—rather, the functionality can be implemented in various ways (e.g., depending on the processing power of the camera devices or computer systems in communication therewith).

In embodiments, the invention can work with existing cameras (e.g., from Pelco, Inc.), and does not require the use of special purpose cameras.

In embodiments, this invention provides a method to use the analytics from at least one first camera device to control PTZ motion for at least one second camera device, for example, to track at least one actionable motion object identified by the at least one first camera device. In embodiments, the tracking (sometimes referred to herein as "multi-camera tracking") works for camera devices that are located at a same position (e.g., within a meter of each other), as well as with camera devices that are located at very different positions, even up to hundreds of meters apart. Additionally, in embodiments the tracking works even if the camera devices are mounted at different heights above the ground, and/or if the ground plane where motion is detected is not parallel to the camera mounting. In embodiments, the at least one second camera device is configured to follow (or track) a first actionable motion object identified by the at least one first camera device even if other objects are detected (e.g., by the at least one first camera device or the at least one second camera device), for example, in a so-called "sticky follow mode." Additionally, in embodiments the at least one second camera device is configured to follow a physically largest object of the identified actionable motion objects, a fastest moving object of the identified actionable motion objects, a closest object of the identified actionable motion objects to the at least one first camera device or the at least one second camera device, and/or a farthest object of the identified actionable motion objects to the at least one first camera device or the at least one second camera device.

In embodiments, the multi-camera tracking allows the at least one first camera device to communicate and provide analytic information to multiple camera devices so that the at least one second camera device (e.g., camera 2, . . . camera N) will track objects in the scene that are detected by the at least one first camera device. In embodiments, a first one (or more) of the at least one second camera device may track a physically largest object of the identified actionable motion objects, a second one (or more) of the at least one second camera device may track a fastest moving object of the identified actionable motion objects, etc. Also, the at least one second camera devices could track the closest object which could be different objects depending on the relative distance of each object to each of the at least one second camera devices.

In embodiments, the tracking will not begin until an identified actionable motion object has moved a predetermined distance, so that small motions such as trees swaying in the wind do not trigger tracking, for example. In one embodiment, only moving cars and people will be tracked. The predetermined distance may be user configured in some embodiments, and stored on a memory device of the at least one first camera device a and/or on a memory device of the at least one second camera device. The predetermined distance (and other information pertaining to the tracking) may also be stored on a server local to or remote from the at least one first camera device and the at least one second camera device in embodiments.

In embodiments, the at least one first camera device and/or the at least one second camera device groups any detected object that is close to another object into one group to provide a view of the group rather than zooming into just one object.

In embodiments, systems and methods for calibrating the at least one first camera device and the at least one second camera device are also provided herein, for example, to allow translation calculations and to optimize tracking accuracy. In one embodiment, a method for calibrating multiple camera devices includes processing a video stream on at least one first camera device and identifying one or more calibration points or objects in the video stream. The at least one first camera device is caused to transmit coordinate information associated with the one or more calibration points or objects to at least one second camera device. The method also includes processing a video stream on the at least one second camera device and identifying the one or more calibration points or objects. The at least one second camera device is caused to generate coordinate information associated with the one or more calibration points or objects. The method further includes determining relative locations of the at least one first camera device to the at least one second camera device based on an evaluation of the coordinate information received from the at least one first camera device with respect to the coordinate information generated by the at least one second camera device. The at least one first camera device and the at least one second camera device are calibrated based on the determined relative locations of the at least one first camera device to the at least one second camera device. In embodiments, the calibration points or objects identified by the at least one second camera device are the same calibration points or objects identified by the at least one first camera device. In some embodiments, the identifying of the calibration points is performed by a user via a web page associated with the camera devices. In other embodiments, the identifying of the calibration points is performed by the camera devices.

The method may include determining tilt or mounting errors for the at least one first camera device and the at least one second camera device based on an evaluation of the coordinate information received from the at least one first camera device with respect to the coordinate information generated by the at least one second camera device. Calibrating the at least one first camera device and the at least one second camera device may include determining the tilt/mount offsets and the relative locations of the camera devices.

The method may include establishing a communication path between at least one first camera device and at least one second camera device. The method may include repeating the method after a predetermined time period or in response to an occurrence of a predetermined condition. The predetermined condition may include detection of a misalignment or position change of at least one of the at least one first camera device and the at least one second camera device.

The method may include repeating the method in response to user input. The at least one first camera device and the at least one second camera device may each include a processor and a memory storage device.

In one embodiment, the method (or calibration procedure) determines position and orientation of each camera device by matching points in the scene from each camera device. The method may also include identifying the point of the at least one second camera device's location in the at least one first camera device's view and vice versa provided the configuration is such that each camera device is visible to the other camera device.

In embodiments, the calibration procedure determines six (or more or fewer) degrees of freedom that describe the position in space (e.g., X, Y, Z) and the orientation angles for the at least one first camera device and the at least one second camera device to enable multi-camera tracking. In embodiments, the calibration procedure provides position and orientation by simply matching four points in view of each camera device rather than requiring precise measurements.

In embodiments, the calibration procedure determines a plurality of parameters that describe position and orientation of the at least one first camera device and the at least one second camera device. In one embodiment, the plurality of parameters comprises two parameters. In one embodiment, the plurality of parameters comprises four parameters. In one embodiment, the plurality of parameters comprises eights parameters. It is understood that substantially any number of parameters may be used to describe position and orientation of the at least one first camera device and the at least one second camera device. The number of parameters may be based on the application and desired accuracy, for example.

In embodiments, the calibration procedure determines the twelve degrees of freedom that describe the position and orientation of two separate camera devices that view parts of the same region. Additionally, in embodiments the calibration procedure only requires a user to match four points in video from both camera devices to drive the calibration procedure. In embodiments, if the user is only able to match two or three points, for example, the calibration procedure still provides an approximation for alignment (or calibration). In embodiments, the calibration procedure provides the user feedback on the "quality" of the alignment where quality is a measure of accuracy of the position and orientation. In embodiments, a simple to use computer or user interface is provided for guiding a user through the process of selecting points and displaying the points on or over the video to show the user the selections.

BRIEF DESCRIPTION OF THE DRAWINGS

The description of the various example embodiments is explained in conjunction with the appended drawings.

FIGS. 10 through 15 illustrate an example of viewing areas of first and second camera devices in which the first camera device can dynamically drive or control a second camera device to track and focus on (or monitor) a moving object(s) in accordance with an exemplary embodiment of the present disclosure.

DISCUSSION OF EXAMPLE EMBODIMENTS

Figure 1:
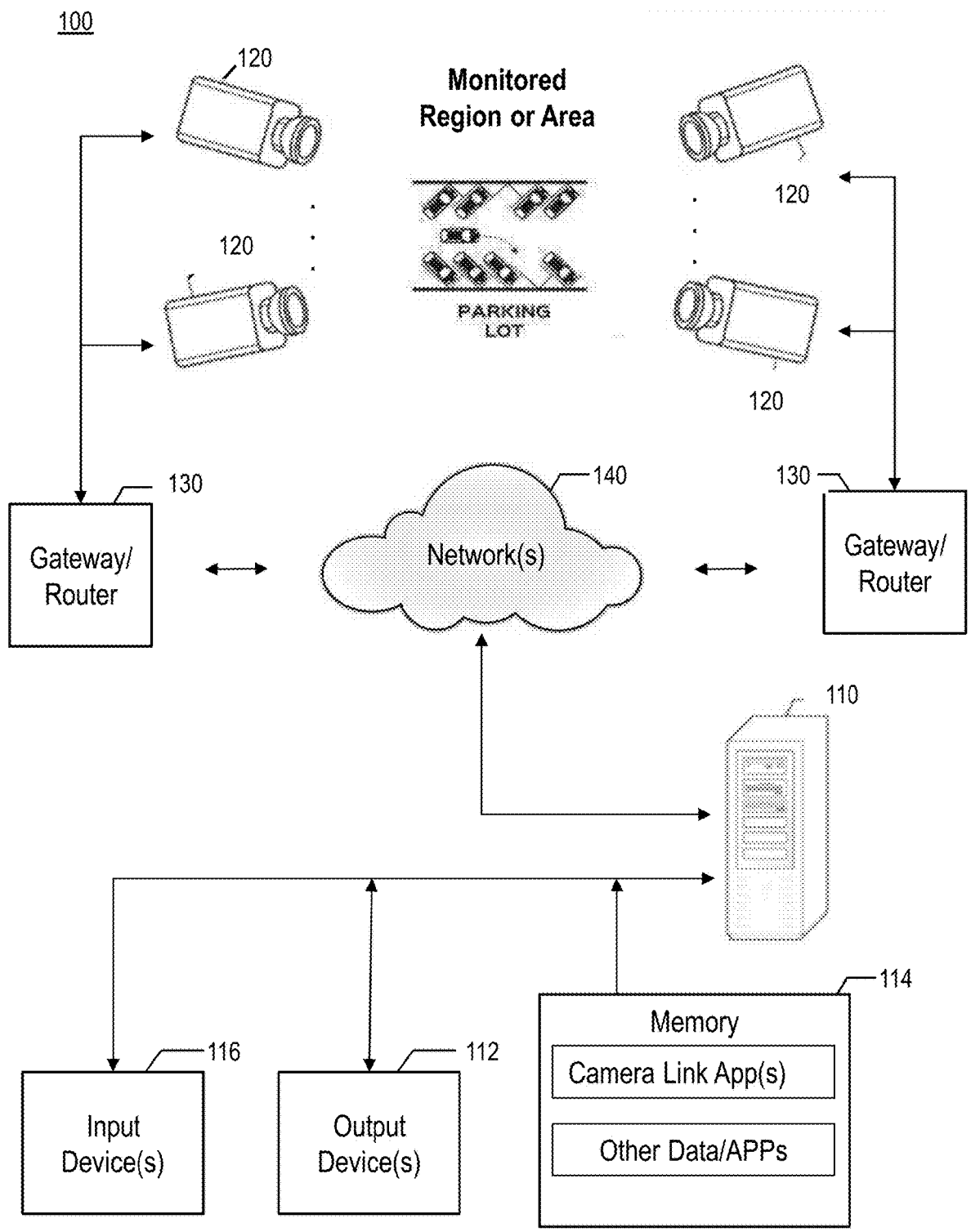
FIG. 1 is an overview of components, systems and/or devices of an exemplary video surveillance system (VSS) including a plurality of camera devices to monitor one or more locations in accordance with an exemplary embodiment of the present disclosure.

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

Systems and methods are provided to implement multi-camera tracking applications in which a first camera device can control or drive, directly or indirectly, one or more second camera devices to track and focus on a moving object(s) surveillance system. Such a moving object can be referred to herein as an actionable motion object (AMO). Multi-camera tracking can be automatically implemented through an auto operator on a camera device(s). The auto operator for the camera device(s) can take advantage of extreme magnification of PTZ cameras without having to dedicate a user to control the camera device. For example, analytic information from imagery captured by a first camera device, e.g., a wide field of view camera, can be used to automatically control or drive one or more second camera devices, e.g., a PTZ camera(s), to provide different views or to track a different object(s). The analytic information can be motion detection analytics from the first camera device or processed from video captured from the first camera device, which can then be used to drive or control the second camera device(s). This tracking process can be completely automatic between camera devices, can operate without any manual control, and/or can be independent of any control from a management system of the VSS. The auto operator can also provide automatic (or auto) tracking for the general case where two camera devices are mounted at completely different locations, and provide different views of a scene.

In order to implement multi-camera tracking, the first and second camera devices are aligned (or calibrated), e.g., the location of the second camera device is aligned relative to the first camera device, or vice-a-versa depending on which camera device is the driven camera device or the driving camera device. This enables a position and orientation on one camera device to be translated to corresponding position and orientation on another camera device. Accordingly, systems and methods are provided herein to align (or calibrate) a location of one or more second camera devices relative to one or more first camera devices, or vice-a-versa. A simple alignment approach is disclosed for determining six degrees of freedom that describe position in space (X,Y,Z) and orientation angles between at least two camera devices to enable multi-camera tracking. Position and orientation information may be determined, for example, by matching one or more common (or matching) calibration points in the view of each camera device rather than requiring manual measurements which can be labor intensive particularly when configuring many camera devices for tracking in general. A graphical user interface (GUI) can be provided to facilitate the linking of camera devices for auto operation, and user selection of such common calibration points from the displayed view of each camera device to be aligned and linked for auto operation. The number of common calibration points to be identified can depend upon the camera installation configuration for the camera devices, known or estimated camera parameters associated with the location of the camera devices as installed, and/or other factors.

These and other features will be described in greater detail below with reference to the figures.

I. Multi-Camera System Environments

Referring to FIG. 1, there is shown an overview of an example video surveillance system (VSS) 100 to monitor one or more interior or exterior regions or areas, such as for example a parking lot of a facility. The VSS 100 can include one or more computer system(s) 110, output device(s) 112 such as display device(s), memory 114, input device(s) 116, and multiple camera devices 120, which can communicate using wireline and/or wireless communications in different system configurations. In this example, the camera devices 120 can communicate with each other and the computer system 100 across one or more network(s) 140 via gateway(s)/router(3) 130. The network(s) 140 can be a wired and/or wireless network that uses, for example, physical and/or wireless data links to carry network data among (or between) the network nodes.

Each camera device 120 can include image sensor(s) for capturing still images or video for storage or streaming (e.g., live streaming). The camera devices 120 can be a dome-type camera, bullet-type camera or other type camera, with features that can include a wide-angle view such as a panoramic view, pan-tilt-zoom (PTZ), motion (or object) detection and tracking, and/or other available camera functions. The camera devices 120 can also include a processor(s), a memory, and a communication device for conducting wireline or wireless communication, such as for example, over the network(s) 140. The camera devices 120 can be configured to perform various operations, including capturing, storing, video processing (e.g., encoding and motion/object detection and tracking), and/or transmitting still images or video such as in the form of a video stream, and/or generating and transmitting analytic information such as motion analytic information associated with detection and tracking of AMOs to other camera devices 120 or computer systems on the VSS 100. The camera devices 120 can also be configured to change their viewing area under manual control or automatic control in response to control commands or other information received from the computer system 110, other camera devices 120 or other computer systems in the VSS 100. The camera devices 120 can also be configured to maintain or access alignment information, such as their location relative to one or more other camera devices 120, and to perform other processes and features described herein. The camera devices 120, which include wide-angle/panorama viewing and motion/object detection, may be a camera from the Optera™ family of cameras by Pelco, Inc. The camera devices 120 with PTZ functionality can be a camera from the Spectra or Espirit family of cameras by Pelco, Inc. The camera devices 120 also can be an IP type-camera to facilitate access thereto over the Internet.

The computer system 110 can be a data/control processing system with one or more processors. The computer system 110, through the one or more processors, can be configured to control or perform or facilitate the performance of various operations associated with video management on the VSS 100, including but not limited to: monitoring of one or more locations using the camera devices 120; managing, controlling or facilitating the operations of the camera devices 120 (via control commands or signals, or other information) including PTZ or viewing area functions, storage/transmission of captured images and video and other related data, camera linking and calibration, and other camera functions; controlling the presentation of video and other information on the display device(s) 112 or other output devices; receiving video and other information from the camera devices 120 and other systems in the VSS 100; receiving user input from the input device(s) 116; and other operations described herein. The computer system 110 can be a standalone processing system or a distributed processing system including a plurality of computer systems.

The output device(s) 112 can be any output device for displaying information, such as images, video or other data described herein including alerts and so forth. The output device(s) 112 can also display graphical user interface(s) or GUIs. The output device 112 can be a monitor, display panel, projector or other display device.

The memory 114 can store applications or programs, which when executed by one or more processors of the computer system 110, control the operations the computer system 110 include those operations described herein. For example, the memory 114 can store applications or programs, such as camera link application(s) to facilitate the set up and operation of multi-camera calibration and tracking, such as described herein. The memory 114 can also store other data including images, video for streaming, alignment/calibration information for the camera devices 120, thresholds or conditions, analytic parameters for motion/object detection, real-time and historical data related to the captured video streams from the camera devices 120, or other data described herein. The camera link application(s) can also be stored and implemented through the camera devices 120 or other computer system on the VSS 100.

The input device(s) 116 can include any user input device such as a mouse, trackball, microphone, touch screen, joystick, control console, keyboard/pad, touch screen or other device operable by a user. In some embodiments, the input device 116 can be used to operate or control any one of the camera devices 120; to initiate, perform or re-initiate a calibration/alignment process including selecting common calibration points; to input information; or to control other operations on the computer system 110, the camera devices 120 or other systems on the VSS 100 including those described herein.

The VSS system environment shown in FIG. 1 is simply provided as one example of a system configuration. The features of camera linking, calibration/alignment and/or auto operator (or operation) can be set up, managed, and implemented directly or indirectly via interactions with the camera devices through cloud computing or other computer system configuration.

Figure 2:
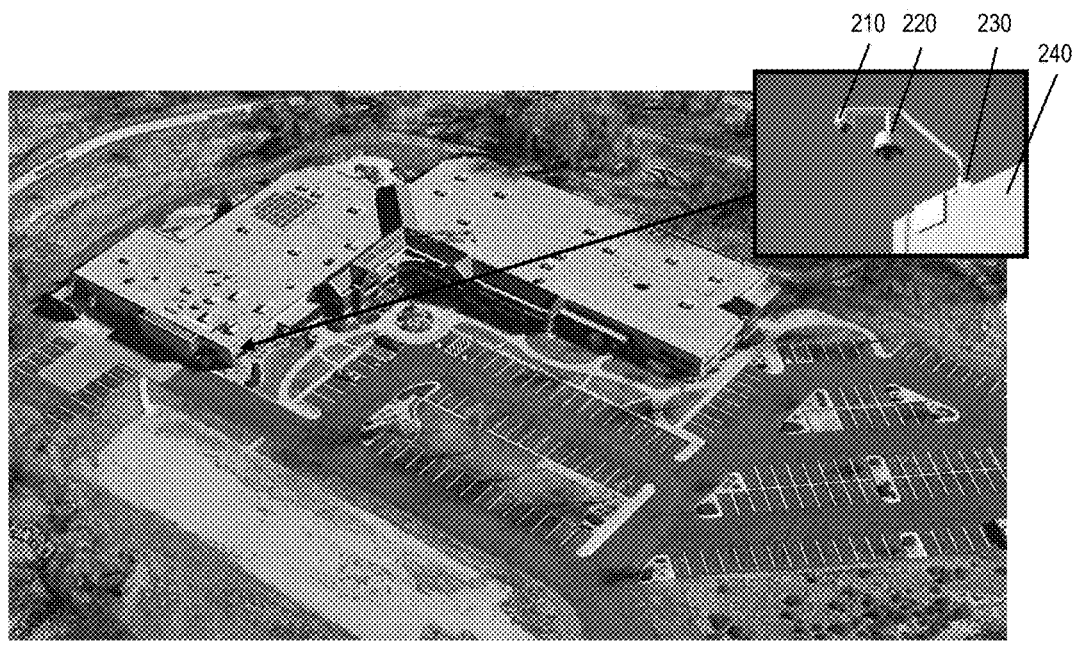
FIG. 2 shows an example system including at least one first camera device and at least one second camera device mounted together on the same mount.

Various example camera installation configurations are described below with reference to FIGS. 2, 3 and 4. Referring to FIG. 2, an example system according to the disclosure is shown including at least one first camera device 210 and at least one second camera device 220. In this example, the at least one first camera device 210 and the at least one second camera device 220 are coupled to a mount 230 (here, a same mount 230) and positioned to monitor one or more areas of a parking lot of a commercial building 240 to which the mount 230 is coupled. In embodiments, the at least one first camera device 210 and the at least one second camera device 220 may be linked through a local area network to a computer system, such as a server, in which videos (or imagery) recorded by the at least one first camera 210 and the at least one second camera 220 may be stored. The server may be a local server, for example, on the premises of the commercial building 240, or a remote server, for example, a cloud-based server. A user connected to either the local area network or the internet may view the videos (or imagery) recorded, and any event data, if the user has access.

Each of the camera devices 210, 220 may include a processor, which may be configured to provide a number of functions. For example, the camera processors may perform image processing, such as motion detection, on video streams captured by the cameras devices 210, 220. Additionally, the camera processors may operate as a network node to communicate with other nodes of the local area network which may link (or otherwise establish a communication path between) the at least one first camera device 210 and the at least one second camera device 220.

In embodiments, the at least one first camera device 210 is configured to process a video stream on the at least one first camera device 210 to identify actionable motion objects (AMOs) in the surveillance scene. The AMOs may, for example, correspond to one or more persons or vehicles.

In embodiments, the at least one first camera devices 210 is also configured to transmit metadata associated with the identified AMOs to the at least one second camera 220. For example, the at least one first camera device 210 may transmit the metadata over the local area network which may link the at least one first camera device 210 and the at least one second camera device 220. The metadata may include coordinates and/or other identifying information about the identified AMOs.

In embodiments, a viewing area of the at least one second camera device 220 is dynamically controlled in response to the metadata to enable the at least one second camera device 220 to track and focus on (or monitor) at least one of the identified AMOs. Dynamically controlling the viewing area of the at least one second camera device 220 may, for example, include dynamically controlling pan-tilt-zoom (PTZ) motion of the at least one second camera 120.

Figure 3:
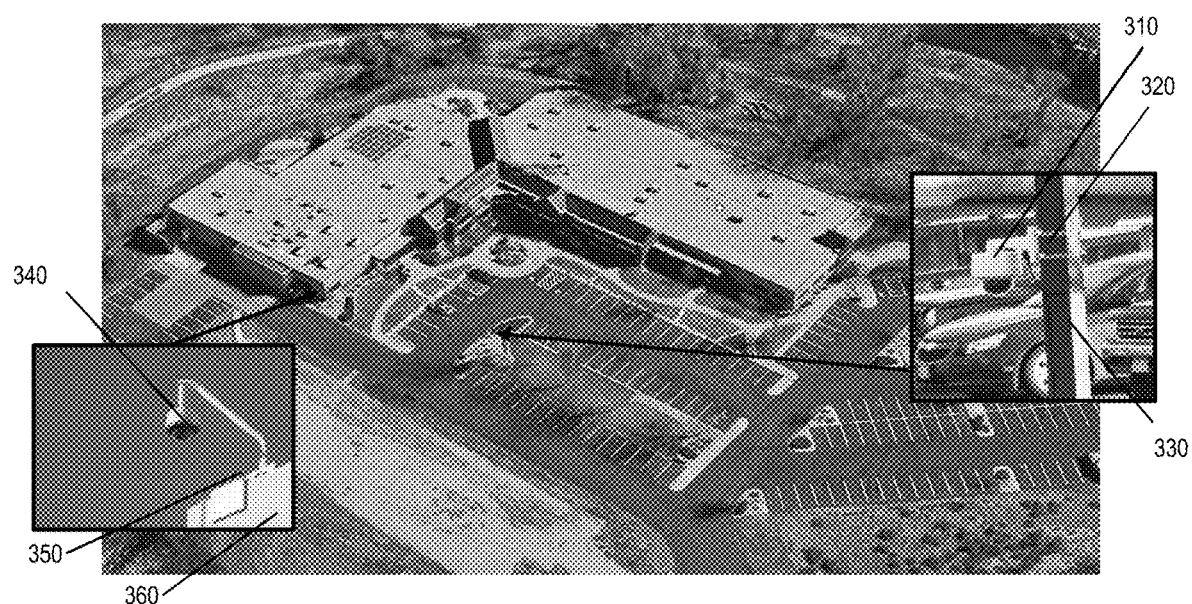
FIG. 3 shows an example system including at least one first camera device and at least one second camera device mounted separately.

Referring to FIG. 3, another example system according to the disclosure is shown including at least one first camera device 310 and at least one second camera device 340, which are mounted at different locations. The at least one first camera device 310 is coupled to a mount 320 which is coupled to a light pole 330 in a parking lot of a commercial building 360. Additionally, the at least one second camera device 340 is coupled to a mount 350 which is coupled to the commercial building 360. Similar to the example system discussed above in connection with FIG. 2, the at least one first camera device 310 and the at least one second camera device 340 of the example system shown in FIG. 3 are each positioned to monitor one or more areas of the commercial building parking lot. Additionally, similar to the example system discussed above in connection with FIG. 2, the at least one first camera device 310 may be configured to process a video stream on the at least one first camera device 310 to identify AMOs in the commercial building parking lot. The at least one first camera device 310 may also be configured to transmit metadata associated with the identified AMOs to the at least one second camera device 340, and a viewing area of the at least one second camera device 340 may be dynamically controlled in response to the metadata to enable the at least one second camera device 340 to track and focus on at least one of the identified AMOs.

Figure 4:
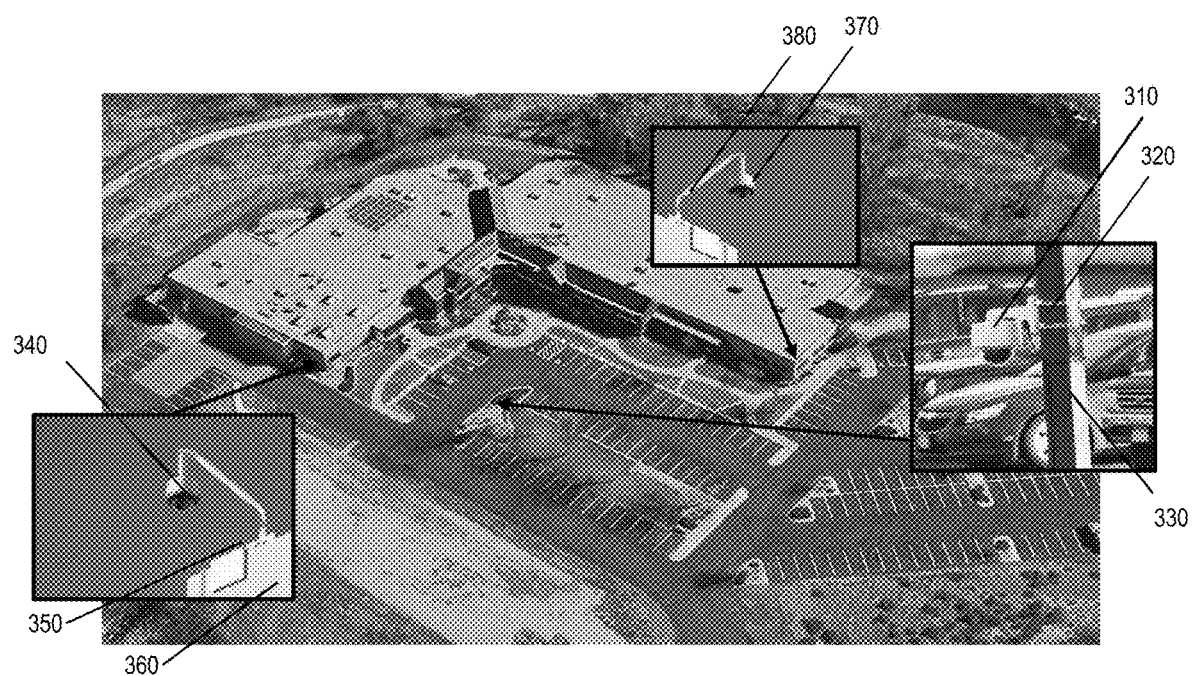
FIG. 4 shows another example system including at least one first camera device and at least one second camera device mounted separately.

Referring to FIG. 4, in which like elements of FIG. 3 are shown having like reference designations, a further example system according to the disclosure is shown. The system includes at least one first camera device 310 and at least one second camera device (here, camera devices 340, 370) in the illustrated embodiment. The at least one first camera device 310 is coupled to a mount 320 which is coupled to a light pole 330 in a parking lot of a commercial building 360. Additionally, a first one of the at least one second camera device (here, a camera device 340) is coupled to a mount 350 which is coupled to a first area of the commercial building 360, and second one of the at least one second camera device (here, a camera device 370) is coupled to a mount 380 which is coupled to a second area of the commercial building 360. In embodiments, camera device 340 is configured to monitor a first area of the commercial building parking lot. Additionally, in embodiments camera device 370 is configured to monitor a second area of the commercial building parking lot. Camera device 310 may process metadata and transmit it to camera devices 340 and 370.

In embodiments, the system may combine a full hemispherical viewing capabilities of the at least one first camera device (e.g., 210, shown in FIG. 2) with the Pan, Tilt and Zoom capabilities of the at least one second camera device (e.g., 220, shown in FIG. 2). The at least one first camera device may detect motion, and transmit information associated with the detected motion to the at least one second camera device, for example, for the at least one second camera device to provide a close up view of the detected motion (more particularly, of actionable motion objects).

In embodiments, the at least one first camera device and the at least one second camera device may be mounted on a same mount, as shown in FIG. 2, for example. Additionally, in embodiments the at least one first camera device and the at least one second camera device may be mounted on separate mounts, as shown in FIGS. 3 and 4, for example.

In embodiments, motion analytics from the at least one first camera device can direct a plurality of second camera devices to allow each of the second camera devices to provide a different view, or to track a different object, as shown in FIG. 4, for example.

In embodiments, calibration to align the at least one first camera device and the at least one second camera device is accomplished from a web page (or another interface means). For example, a one time installation and setup may be used and can be accomplished from the web page of a camera device. In embodiments, dimensions, CAD models, blue prints are not required. All that may be required for the camera devices to determine the location of each camera device is for the installer to match multiple points.

II. Translation and Alignment

Multi-camera tracking can use analytic information, such as motion analytic information, from or associated with a first camera device to drive or control one or more second camera devices. By way of example, a first camera device can be a wide field of view camera with a fixed viewing, and a second camera device can be a PTZ (Pan Tilt Zoom) camera where the PTZ is adjusted to zoom into the scene and provide significantly or even extremely high details. To setup and perform multi-camera tracking, there are two methods (or processes) which can be implemented, such as a translation method and an alignment method. The translation method can take analytic information from the first camera device, such as for example in the form of angles for Pan and Tilt coordinates, and convert them to coordinates in the plane of motion. These coordinates can then be converted to Pan, Tilt angles and Zoom positions to control the second camera device. The alignment method (also referred to as "calibration" method or process) can use video information, such as an image or video stream, from the two camera devices to determine the geometry, such as the spatial position and/or orientation, of the two camera devices in order to enable translation of coordinates from one camera device to another camera device. Both of these methods can handle the general case where the two camera devices are mounted at completely different locations and provide different views of a scene, as well as other camera configurations.

The translation method can involve the use of multiple coordinate systems. For example, one coordinate system can be the reference coordinate system or the Ref system $(X_t, Y_t, Z_t)$, also referred to as the Global system. The reference coordinate system is fixed to the world, and all motion is in this system. Furthermore, in an example embodiment, a simplification can be used in the translation method in that all motion is considered in the $Y_t=0$ plane of the Ref system. Each camera device can also be mapped to two additional coordinate systems (as described below). In this example, all coordinate systems are Right Handed, and all angles are positive for counterclockwise (CCW) direction looking into the individual axis. The $Y_t$ axis for the Ref system is normal to the ground with positive values pointing toward the sky.

For a two camera device set up, there can be five coordinate systems, e.g., the Ref system, two coordinate systems for the first camera device, and two coordinate systems for the second camera device. An example of the five coordinate systems can include the following:

$(X_t, Y_t, Z_t)$=the overall reference coordinate or global system fixed to the world (with "t" denotes tracking). All motion occurs in the $Y_t=0$ plane. $Y_t$ is normal to the earth, with positive pointing toward the sky.

$(X_{np}, Y_{np}, Z_{np})$=a coordinate system for the first camera device. This coordinate system can be referenced to a gang of multiple lenses (e.g., four lenses), or to a single lens for a wide angle camera for the first camera device. This coordinate system is referenced with the point (0,0,0) centered at the center of the first camera device, but since the gang of lenses may tilt on the camera gimbal, the axis $X_{np}$, $Y_{np}$, and $Z_{np}$ are in general not parallel to $X_t$, $Y_t$, $Z_t$ axis.

$(X_p, Y_p, Z_p)$=another coordinate system also centered on the first camera device with the point (0,0,0) centered at the first camera device. However, this coordinate system is parallel to the $X_t, Y_t, Z_t$ system, e.g., $X_p$ is parallel to $X_t$, $Y_p$ to $Y_t$, and $Z_p$ to $Z_t$. This coordinate system can also be considered as the coordinate system for the camera mount of the first camera device.

$(X_{ns}, Y_{ns}, Z_{ns})$=a coordinate system for the second camera device. This coordinate system is referenced to the second camera device itself. For the second camera device, this is referenced with the point (0,0,0) at the center such as of the dome in a dome-type camera. As with the first camera device, the axis $X_{ns}$, $Y_{ns}$, and $Z_{ns}$ are in general not parallel to $X_t$, $Y_t$, $Z_t$ axis.

$(X_s, Y_s, Z_s)$=another coordinate system which is centered on the second camera device with the point (0,0,0) centered at the center such as of the dome in a dome-type camera. However this coordinate system is parallel to the $X_t, Y_t, Z_t$ system. This coordinate system can also be considered as the mount system of the second camera device.

Figure 5:
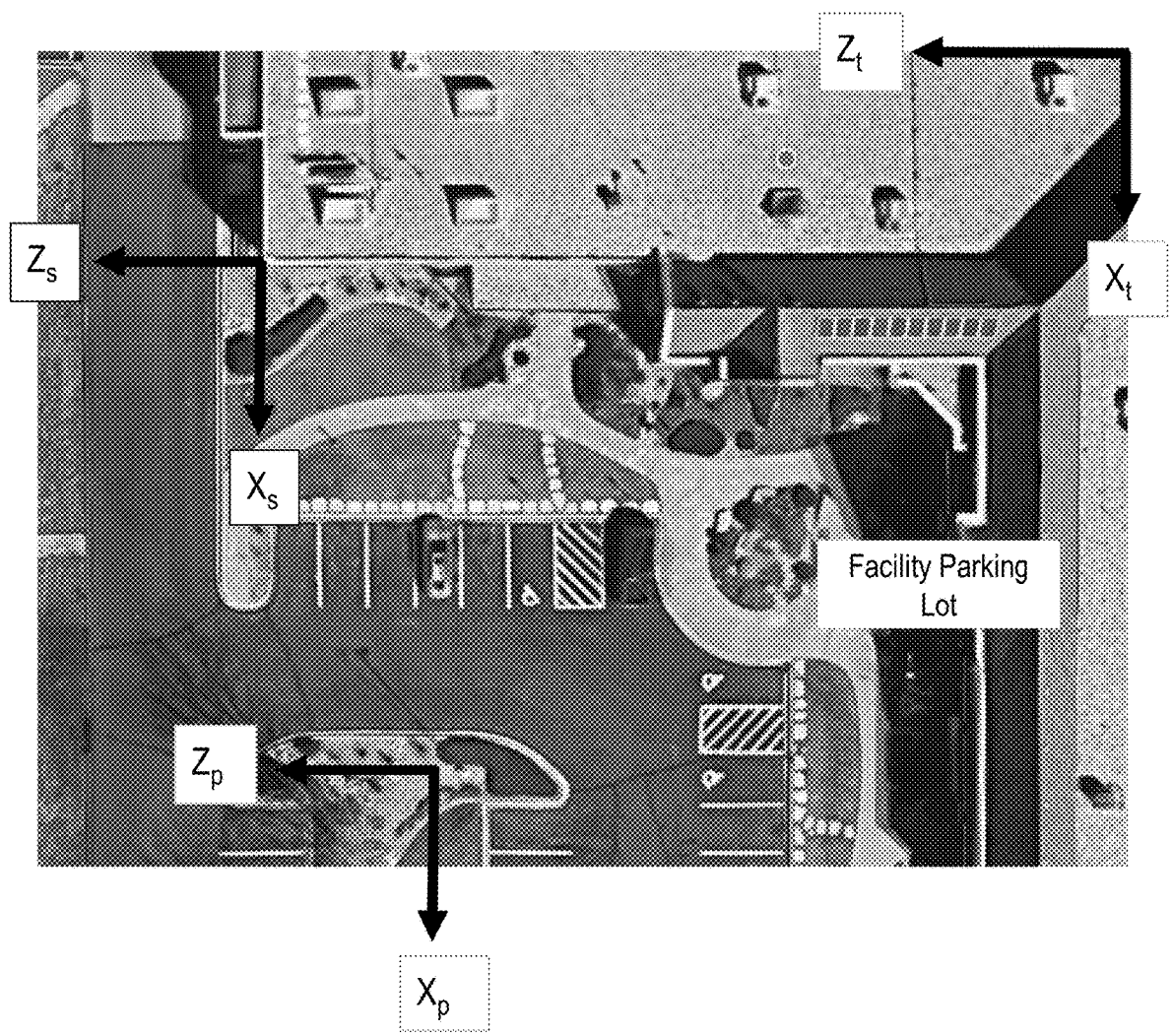
FIG. 5 shows an example of the coordinate systems for a first camera device and a second camera device and a reference coordinate such as the global reference coordinate system with reference to a VSS system in a region or area, such as shown in the examples of FIGS. 2-4

An example of three of the five coordinate systems above is shown in FIG. 5 in which the first camera device is mounted to a top corner of a building in a facility and the second camera device is mounted on a pole in the parking lot of the facility (see, e.g., camera devices 340 and 310 in FIG. 4). As shown in FIG. 5, the Ref system $(X_t, Y_t, Z_t)$ is fixed to the world, and all motion can be tracked into this reference coordinate system. Separate coordinate systems can be fixed to each camera device, e.g., the coordinate system $(X_p, Y_p, Z_p)$ for the first camera device, and the coordinate system $(X_s, Y_s, Z_s)$ for the second camera device.

To translate coordinates from the first camera device to coordinates on the second camera device, the position/orientation of each camera device relative to the Ref system is needed. In one example, the position/orientation for each camera device can be expressed as alignment parameters, for example, in six degrees of freedom, such as three positions (e.g., X, Y and Z) and three angles corresponding to the rotation about each position axis. The alignment parameters can, for example, include the following six parameters for each of the first camera device and the second camera device, as follows:

First Camera Device $H_p$=Height of camera above motion plane (e.g., a positive value)

$A_p$=Camera $X_t$ position $B_p$=Camera $Z_t$ position $\beta_{xp}$=Tilt rotation of the camera about $X_t$-axis with respect to the Ref System $\beta_{zp}$=Tilt rotation of the camera about $Z_t$-axis with respect to the Ref System $\beta_{yp}$=Pan rotation of the camera about $Y_t$-axis with respect to the Ref System Second Camera Device $H_s$=Height of camera above motion plane (e.g., a positive value).

$A_s$=Camera $X_t$ position $B_s$=Camera $Z_t$ position $\beta_{xs}$=Tilt rotation of the camera about $X_t$-axis with respect to the Ref System $\beta_{zs}$=Tilt rotation of the camera about $Z_t$-axis with respect to the Ref System $\beta_{ys}$=Pan rotation of the camera about $Y_t$-axis with respect to the Ref System The alignment parameters are fixed for a specific camera installation, and do not change. Once the alignment parameters, in this example twelve (12) alignment parameters, are known, it is possible to translate from a pan and tilt position of the first camera device to a pan and tilt position of the second camera device. There can, however, be more or fewer alignment parameters for calibrating the camera devices. An example of the alignment method to determine these parameters will be described in further detail below.

A. Translation Function—from Camera to Ref System:

In this section, an example of a translation function for the translation method is described to translate a camera device's pan and tilt values (e.g., obtained from motion detection) to a position in the reference coordinate system. For example, a first camera device can detect motion with a pan angle and a tilt angle, which are respective to the camera device. The translation function can take the pan and tilt values from the first camera device, and convert them to X,Y,Z positions in the reference plane of the Ref system. If desired, this position could be displayed on a map (e.g., a map of the monitored region or area). An inverse of this function will be described further below to take an X,Y position in the reference plane and calculate pan and tilt values of a camera device, such as the second camera device, to view that position.

An example of the operations of the translation function, e.g., $(X,Y,Z)=f(\theta,\phi)$, to translate a pan and tilt position/angle $(\theta,\phi)$ of a camera device (e.g., first camera device) to the reference plane (X,Y,Z) can include seven operational steps for the purposes of explanation, which is described as follows.

The operations can begin with the pan and tilt angles of the camera device. These angles are relative to the camera device itself, and can be expressed as:

$\theta_{np}$=Pan=range of either 0° to 360° or
  −180°<Pan<180°. The pan angle is a rotation
  around the $Y_{np}$-axis, and is positive for counter-
  clockwise or CCW rotation when looking into
  the camera $Y_{np}$-axis.

$\phi_{np}$=Tilt=range(−90°<Tilt<+90°). The tilt angle is
  measured from the $Y_{np}$=0 plane where −90° is
  pointing generally at the ground, and 0° is
  viewing generally to the horizon.

The pan and tilt angles can be considered as specifying a ray that starts at the origin (e.g., a center of the camera device), and intersects the point of motion in the motion plane. This ray also intersects a sphere with radius 1 centered at the origin (e.g., a unit sphere). The point on the unit sphere $(X_{np},Y_{np},Z_{np}$— coordinate system) comes from converting spherical to Cartesian coordinates (e.g., with a unit sphere R=1).

$X_{np}=R \cos \phi_{np} \cos \theta_{np}$ $Z_{np}=-R \cos \phi_{np} \sin \theta_{np}$ $Y_{np}=R \sin \phi_{np}$ The point can then be transformed to a new rotated coordinate system $(X_p,Y_p,Z_p)$. For example, the $(X_p,Y_p,Z_p)$ coordinate system is still centered at the camera device, but is rotated so the three axis are parallel to the three axis of the reference coordinate system (e.g., the rotations were given as $\beta_{xp}$, $\beta_{yp}$, $\beta_{zp}$). One method for this transformation can use matrix multiplication with a 3×3 matrix rotation $T_p$:

$$T_p = \begin{vmatrix} & X\text{-axis Rotation} & \\ 1 & 0 & 0 \\ 0 & \cos-\beta_{xp} & -\sin-\beta_{xp} \\ 0 & \sin-\beta_{xp} & \cos-\beta_{xp} \end{vmatrix} *$$

$$\begin{vmatrix} & Z\text{-axis Rotation} & \\ \cos\beta_{zp} & 0 & \sin\beta_{zp} \\ 0 & 1 & 0 \\ -\sin\beta_{zp} & 0 & \cos\beta_{zp} \end{vmatrix} * \begin{vmatrix} & Y\text{-axis Rotation} & \\ \cos\beta_{yp} & -\sin\beta_{yp} & 0 \\ \sin\beta_{yp} & \cos\beta_{yp} & 0 \\ 0 & 0 & 1 \end{vmatrix}$$

$$\begin{vmatrix} X_p \\ Z_p \\ Y_p \end{vmatrix} = T_p * \begin{vmatrix} X_{np} \\ Z_{np} \\ Y_{np} \end{vmatrix}$$

If matrix math functions are not available, the expression can be multiplied out to give the following:

$$T_p = \begin{vmatrix} T_{11} & T_{12} & T_{13} \\ T_{21} & T_{22} & T_{23} \\ T_{31} & T_{32} & T_{33} \end{vmatrix}$$

where:

$T_{11} = \cos\beta_{zp} \cos\beta_{yp}$ $T_{12} = -\cos\beta_{zp} \sin\beta_{yp}$ $T_{13} = \sin\beta_{zp}$ $T_{21} = \cos\beta_{xp} \sin\beta_{yp} + \sin\beta_{xp} \sin\beta_{zp} \cos\beta_{yp}$ $T_{22} = \cos\beta_{xp} \cos\beta_{yp} - \sin\beta_{xp} \sin\beta_{zp} \sin\beta_{yp}$ $T_{23} = -\sin\beta_{xp} \cos\beta_{zp}$ $T_{31} = \sin\beta_{xp} \sin\beta_{yp} - \cos\beta_{xp} \sin\beta_{zp} \cos\beta_{yp}$ $T_{32} = \sin\beta_{xp} \cos\beta_{yp} + \cos\beta_{xp} \sin\beta_{zp} \sin\beta_{yp}$ $T_{33} = \cos\beta_{xp} \cos\beta_{zp}$ Using these values gives the coordinates of the point on the unit sphere but with the parallel coordinate system. This point specifies a point on the unit sphere, not in the motion plane.

$X_{p1}=T_{11}X_{np}+T_{12}Z_{np}+T_{13}Y_{np}$ $Z_{p1}=T_{21}X_{np}+T_{22}Z_{np}+T_{23}Y_{np}$ $Y_{p1}=T_{31}X_{np}+T_{32}Z_{np}+T_{33}Y_{np}$

To determine the point in the motion plane, the unit sphere point is first converted to spherical coordinates to give pan and tilt angles in the $X_p,Y_p,Z_p$ coordinate system. These are pan and tilt angles relative to the parallel to motion plane coordinate system.

$\theta_p=-a \tan 2(Z_{p1},X_{p1})$ $\phi_p=a \tan 2(Y_{p1},\text{sqrt}(X_{p1}^2+Z_{p1}^2))$ An alternative approach can be employed to approximate the pan and tilt values. For example, if the mounting tilts $\beta_{xp}$, $\beta_{yp}$ are small and the pan offset $\beta_{xp}=0$, then a simpler approximation to $\phi_p$ follows.

$$\phi_p = \phi_{np} - \tan^{-1}[\tan \beta_{yp} \cos(\theta_{np} - \beta_{yp}) + \tan \beta_{xp} \sin(\theta_{np} - \beta_{yp})]$$

For small angles, this approximation can provide almost the same results as the matrix method described above.

Once again, the pan and tilt angles can be considered as specifying a ray that extends from the center of the camera device and intersects the motion plane ($Y_t=0$). This intersection point is determined for this ray with the motion plane in the $X_p, Y_p, Z_p$ coordinate system. First, the straight line distance is determined from the camera device to the motion plane intersection point. Thereafter, using the distance along with the angles, the $X_p, Y_p, Z_p$ coordinates of the motion is determined. It is noted that this is the place where we divide by the sine of an angle.)

$$R_p = -H_p/\sin \phi_p, \text{ if } \phi_p < 0°$$

$R_p$=infinity, if $\phi_p>0°$ (If this angle is zero or positive, then the point is at or above the horizon, an infinite distance from the camera device.)

$$X_p = R_p \cos \phi_p \cos \theta_p$$

$$Z_p = -R_p \cos \phi_p \sin \theta_p$$

$$Y_p = R_p \sin \phi_p$$

Finally, the point in the parallel plane of the camera device is translated to coordinates in the Ref System:

$$X_t = X_p + A_p$$

$$Z_t = Z_p + B_p$$

$$Y_t = Y + H_p = 0$$

The above describes one example approach for the translation function used in the translation method. It should be understood that variants of the translation function or other translation approaches can be employed to convert coordinates from a camera device to the Ref system or motion plane.

B. Inverse Translation Function—from Ref System to Camera:

In this section, an example of an inverse-translation function for the translation method is described to translate a position in the reference coordinate system or motion plane to a camera device's pan and tilt values in order to view that position.

The operations for the inverse-translation function can begin with a point $X_t, Y_t, Z_t$ in the motion plane ($X_t, Y_t, Z_t$). Since this is in the plane, the point is ($X_t, 0, Z_t$).

The point can then be translated to the coordinate system ($X_s, Y_s, Z_s$). For example, this coordinate system is centered at the second camera device and its axis is parallel to the axis of the motion plane, so translating may only require subtracting the position of the second camera device relative to the motion plane.

$$X_s = X_t - A_s$$

$$Z_s = Z_t - B_s$$

$$Y_s = Y_t - H_s = -H_s$$

Using the rotation matrix for the second camera device, this point is translated to the ($X_{ns}, Y_{ns}, Z_{ns}$) system:

$$\begin{vmatrix} X_{ns} \\ Z_{ns} \\ Y_{ns} \end{vmatrix} = T_s^{-1} * \begin{vmatrix} X_s \\ Z_s \\ Y_s \end{vmatrix}$$

where this is the inverse of the rotation matrix for the second camera device.

If matrix math functions are not available, then the expression can be multiplied out to give the following:

$$\begin{vmatrix} T_{11} & T_{12} & T_{13} \\ T_{21} & T_{22} & T_{23} \\ T_{31} & T_{32} & T_{33} \end{vmatrix}$$

where:

$T_{11} = \cos\beta_{ys} \cos\beta_{zs}$ $T_{12} = \cos\beta_{ys} \sin\beta_{zs} \sin\beta_{xs} + \sin\beta_{ys} \cos\beta_{xs}$ $T_{13} = -\cos\beta_{ys} \sin\beta_{zs} \cos\beta_{xs} + \sin\beta_{ys} \cos\beta_{xs}$ $T_{21} = -\sin\beta_{ys} \cos\beta_{zs}$ $T_{22} = -\sin\beta_{ys} \sin\beta_{zs} \sin\beta_{xs} + \cos\beta_{ys} \cos\beta_{xs}$ $T_{23} = \sin\beta_{ys} \sin\beta_{zs} \cos\beta_{xs} + \cos\beta_{ys} \sin\beta_{xs}$ $T_{31} = \sin\beta_{zs}$ $T_{32} = -\cos\beta_{zs} \sin\beta_{xs}$ $T_{33} = \cos\beta_{zs} \cos\beta_{xs}$ The following values are used:

$$X_{ns} = T_{11}X_s + T_{12}Z_s + T_{13}Y_s$$

$$Z_{ns} = T_{21}X_s + T_{22}Z_s + T_{23}Y_s$$

$$Y_{ns} = T_{31}X_s + T_{32}Z_s + T_{33}Y_s$$

Finally, this point is converted to spherical coordinates to determine the pan and tilt angles that are needed for the second camera device to view the point in the motion plane. It should be noted that these angle are relative to the body of the second camera device since they are in the ($X_{ns}, Y_{ns}, Z_{ns}$), the mount tilted coordinate system.

$$\theta_{ns} = \text{Pan} = -a\tan 2(Z_{ns}, X_{ns})$$

$$\phi_{ns} = \text{Tilt} = a\tan 2(Y_{ns}, \text{sqrt}(X_{ns}^2 + Z_{ns}^2))$$

The above describes one example approach for the inverse-translation function of the translation method. It should be understood that variants of the inverse-translation function or other inverse-translation approaches can be employed to convert coordinates from the Ref system or motion plane to those of the camera device.

C. Alignment Function:

In this section, an example of an alignment function for the alignment method is described to match objects in the video captured from a first camera device to the same objects in the second camera device in order to determine the geometrical position and orientation of the two camera devices relative to the plane of motion (e.g., the reference plane).

As previously discussed, alignment parameters, such as for example, six degrees of freedom, can be used to describe the orientation of each camera device relative to the reference coordinate system for a total of twelve (12) parameters. These parameters are fixed for a specific installation and do not change. Once determined, they are all constant values. They only need to be determined one time when the camera devices are mounted. As described earlier, in this example, each camera device can have three positions, and three angles for a total of 12 unknown parameters.

First Camera Device $H_p$=Height of camera above motion plane (e.g., a positive value).
$A_p$=Camera $X_t$ position
$B_p$=Camera $Z_t$ position
$\beta_{xp}$=Tilt rotation of the camera about $X_t$-axis with respect to the Ref System
$\beta_{zp}$=Tilt rotation of the camera about $Z_t$-axis with respect to the Ref System
$\beta_{yp}$=Pan rotation of the camera about $Y_t$-axis with respect to the Ref System Second Camera Device $H_s$=Height of camera above motion plane (e.g., a positive value).
$A_s$=Camera $X_t$ position
$B_s$=Camera $Z_t$ position
$\beta_{xs}$=Tilt rotation of the camera about $X_t$-axis with respect to the Ref System
$\beta_{zs}$=Tilt rotation of the camera about $Z_t$-axis with respect to the Ref System
$\beta_{ys}$=Pan rotation of the camera about $Y_t$-axis with respect to the Ref System One approach to determine the alignment parameters is for an installer to use measuring tools such as theodolites, levels and tape measures to determine the parameters and then input and stored them on the camera device(s) or other system of the VSS. Such an approach, however, can be very tedious and challenging since measurements with fraction of degrees tolerance are required.

Systems and methods are provided herein to implement a significantly simpler and user-friendly approach for determining the alignment parameters for two or more camera devices. The systems and methods can be implemented without any measuring tools, and through a user interface, such as a web interface, which can communicate and interact with both camera devices. The installer can view video (e.g., image or video stream) from both camera devices, and match one or more common calibration points depending on the installation configuration (e.g., common-mount, separate-mount, etc.), desired calibration accuracy, estimates and other camera system configuration information.

Figure 6:
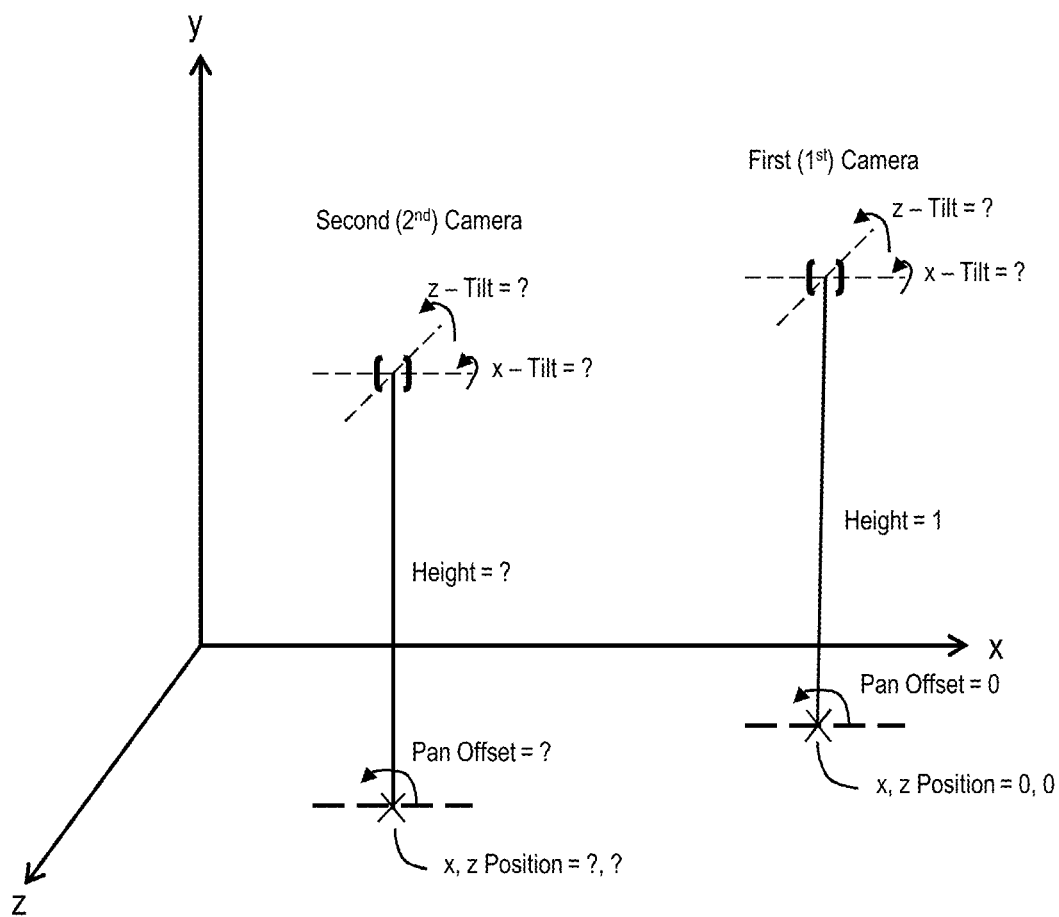
FIG. 6 illustrates an example of alignment (or calibration) parameters in an x, y, z coordinate system for use in aligning a location of one camera device relative to another camera device in accordance with an exemplary embodiment of the present disclosure.

Before calibration, the values for the twelve alignment parameters are unknown. In one example, the X and Z locations (X,Z) of the first camera device can be set at 0,0 and the height of the first camera device can be set equal to 1. The pan rotation of the first camera device can be defined as 0, or aligned with the x-axis of the reference system. This leaves eight unknowns that need to be determined through the calibration process (see, e.g., FIG. 6 in which four of the parameters are assigned fixed values and the remaining eight parameters are unknown and their values are shown as "?"). Four corresponding calibration points for each camera device can be used for determining the remaining eight unknown alignment parameters. After the four common calibration points are matched, the systems and methods can determine the alignment parameters (e.g., the twelve parameters) to enable two camera tracking. An operational example for performing an alignment (or calibration) of the first and second camera devices are provided as follows.

In one example, the viewing area of the first and second camera devices are controlled to overlap, and the video from the camera devices are displayed on a display device. The user, such as an installer, can view the video captured from the first and second cameras devices and select one or more common calibration points through a user interface (e.g., GUI). In this example, the user can select four common calibration points on the ground plane for each camera device from the displayed video captured from the first and second camera devices. For example, the user can move a cursor on the display screen to point and select (using an input device) a desired common calibration point on the displayed video of the first camera device and then on the displayed video of the second camera device, or vice-a-versa. The user can employ common objects or features, which are displayed in the videos of both camera devices, to provide a frame of reference from which to select the common points (e.g., a sign, lamp or other post, a curb, street markings, a parked vehicle, a tree or other plant feature, or other objects and features). In this example, the common calibration points are on the motion plane which is the plane at the base of objects that will be tracked. Typically, the motion plane will be the ground or floor of the surveillance scene. A more detailed example will be described further below in the calibration link setup example.

From the selected four common calibration points, eight pairs of pan and tilt values can be generated, e.g., four pairs from each camera device:

$\theta_{1n},\phi_{1n}$=Pan Angle,Tilt Angle,Camera1,Points $n$=1 to 4

$\theta_{2n},\phi_{2n}$=Pan Angle,Tilt Angle,Camera2,Points $n$=1 to 4

Using the translation method previously described above, these eight pan tilt angles can be converted to eight X,Y,Z points in the reference plane. Since Y=0 is defined for the reference plane in this example, all points have Y=0. This translation method can generate four pairs of X,Z values for each camera device from the translation function, $(X,0,Z)=f(\theta,\phi)$. Each of the X and Z values is a function of the Pan and Tilt angles and of the unknown:

$X_{1n},0,Z_{1n}$=Camera 1,Points $n$=1 to 4

$X_{2n},0,Z_{2n}$=Camera 1,Points $n$=1 to 4

Since the user can carefully view each video and match the points, the X value determined from the first camera device matches the X value for the second camera device. The same is true for Z values. This provides eight equations with the 12 unknowns.

$X_{11}=X_{21}$ $X_{12}=X_{22}$ $X_{13}=X_{23}$ $X_{14}=X_{24}$ $Z_{11}=Z_{21}$ $Z_{12}=Z_{22}$ $Z_{13}=Z_{23}$ $Z_{14}=Z_{24}$

The result is a system of equations with multiple unknowns. Numerical techniques allow solving systems of equations to determine the unknowns. However, since eight equations allow solving for eight unknowns, this can be simplified by setting four of the twelve alignment parameters, leaving only eight unknown parameters. This two camera tracking method may only need angles to direct the second camera device, so by defining the origin of the Ref coordinate system to match the origin of the first camera device but with height=1, four parameters are set to:

$A_p = 0$ $B_p = 0$ $H_p = 1$ $B_{yp} = 0$

The four alignment parameters are set as above, which leaves eight equations and eight unknowns. There are various numerical methods to solve these equations to provide the eight remaining alignment parameters, in this example.

Although the alignment operations have been described using four common calibration points, the alignment method can still be used to provide an approximation for alignment using two or three common calibration points (e.g., where some of the other parameters can be estimated or approximated or have a predefined value depending on the camera installation configurations).

III. Example Processes

Figure 7:
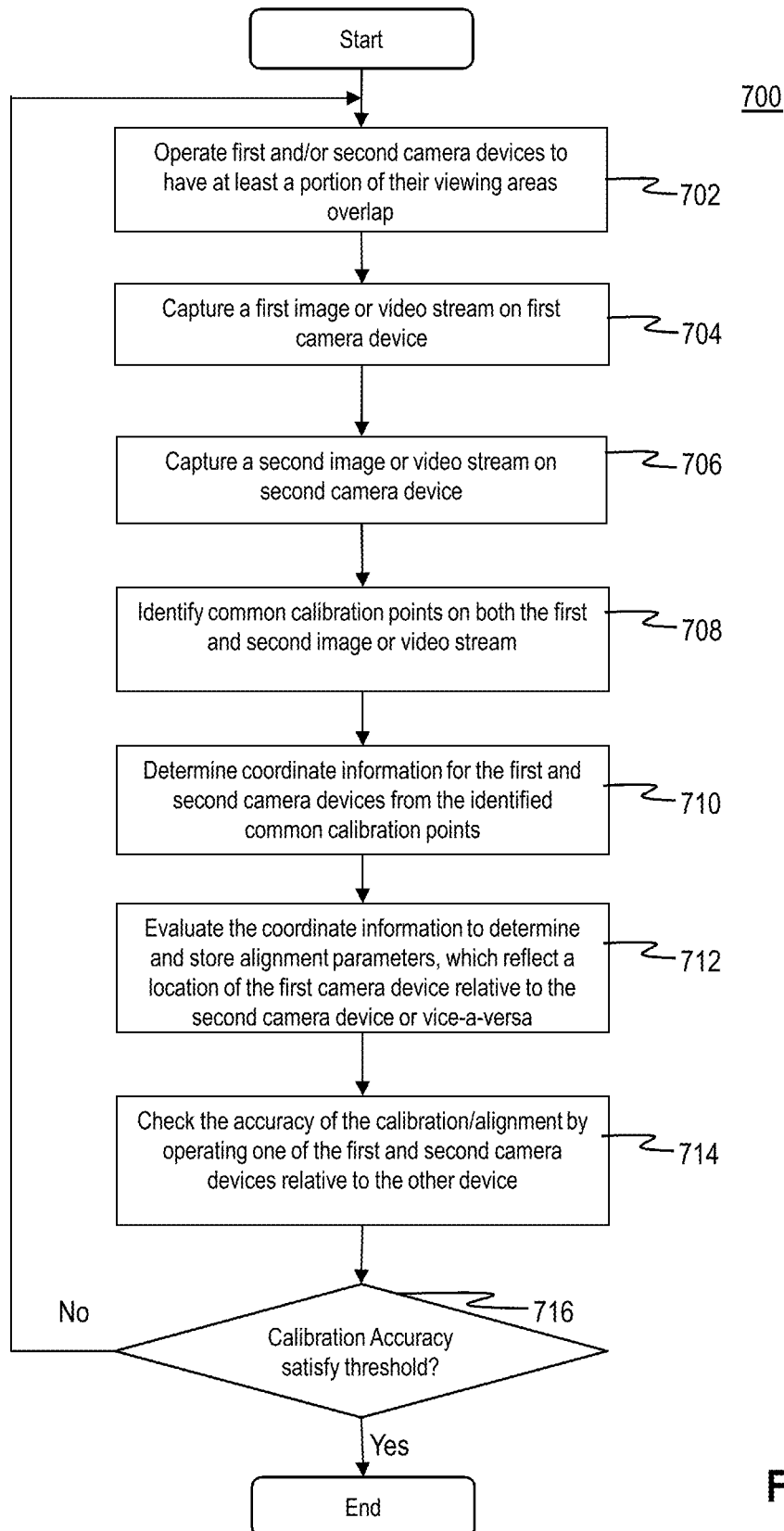
FIG. 7 illustrates an example process by which two or more camera devices can be calibrated (or aligned) for use in a multi-camera tracking application in accordance with an exemplary embodiment of the present disclosure.

FIG. 7 illustrates an example process 700 by which two or more camera devices can be calibrated (or aligned) for use in a multi-camera tracking application in accordance with an exemplary embodiment of the present disclosure. For the purposes of explanation, the process 700 can be implemented under control of one or more computer systems.

At reference 702, the first and/or second camera devices are operated to have at least a portion of their viewing areas overlap.

At reference 704, the first camera device is operated to capture a first image or video stream.

At reference 706, the second camera device is operated to capture a second image or video stream.

At reference 708, one or more common calibration points are identified on both the first image or video stream and the second image or video stream. The common calibration points can be on a ground plane. In one example, the identification of these points can be performed by user selection through a graphical user interface, which can display the image or video of the viewing areas of the first and second camera devices. Alternatively, the identification can be performed automatically through an object/feature recognition program or application, which can identify common objects or features and select common points on a ground plane relative to these common objects or features on both the image or video from the first camera device and the image or video from the second camera device. In either case, the common calibration points are may be selected at a suitable distance away from each other to increase an accuracy of the calibration process.

At reference 710, the coordinate information for the first and second camera devices are determined from the identified common calibration points.

At reference 712, the coordinate information is evaluated to determine and store one or more alignment parameters, which reflect a relative location (e.g., position and/or orientation) of the second camera device relative to the first camera device or vice-a-versa.

At reference 714, the alignment parameters are checked for accuracy. The alignment parameter check can be performed automatically by analyzing the calculated values of the parameters to determine a calibration accuracy value (e.g., the numeric solver example described herein). The alignment parameter check can also be performed under control of a user who can select a point in the viewing area of the first camera device to initiate a tracking operation on the second camera device to that point. The accuracy of the alignment parameters can reflect the proximity of the tracking operation on the second camera device in relation to a selected point on the first camera device.

At reference 716, a determination is made on whether the calibration accuracy of the alignment parameters satisfies a threshold (or condition). If not, the process 700 can be repeated. Otherwise, the process 700 ends.

The process 700 can be performed through a cloud-based application, through which the user on a computer system can connect with the two camera devices using a browser, in order to setup and enable an auto operator function to have one camera device drive or control the other camera device, and to calibrate the two camera devices for multi-camera tracking in general. The various operations of the process 700 can be implemented through a computer system, such as one of the camera devices, a computer system operated by a user, other systems on the VSS or a combination thereof in a distributed manner.

Figure 8:
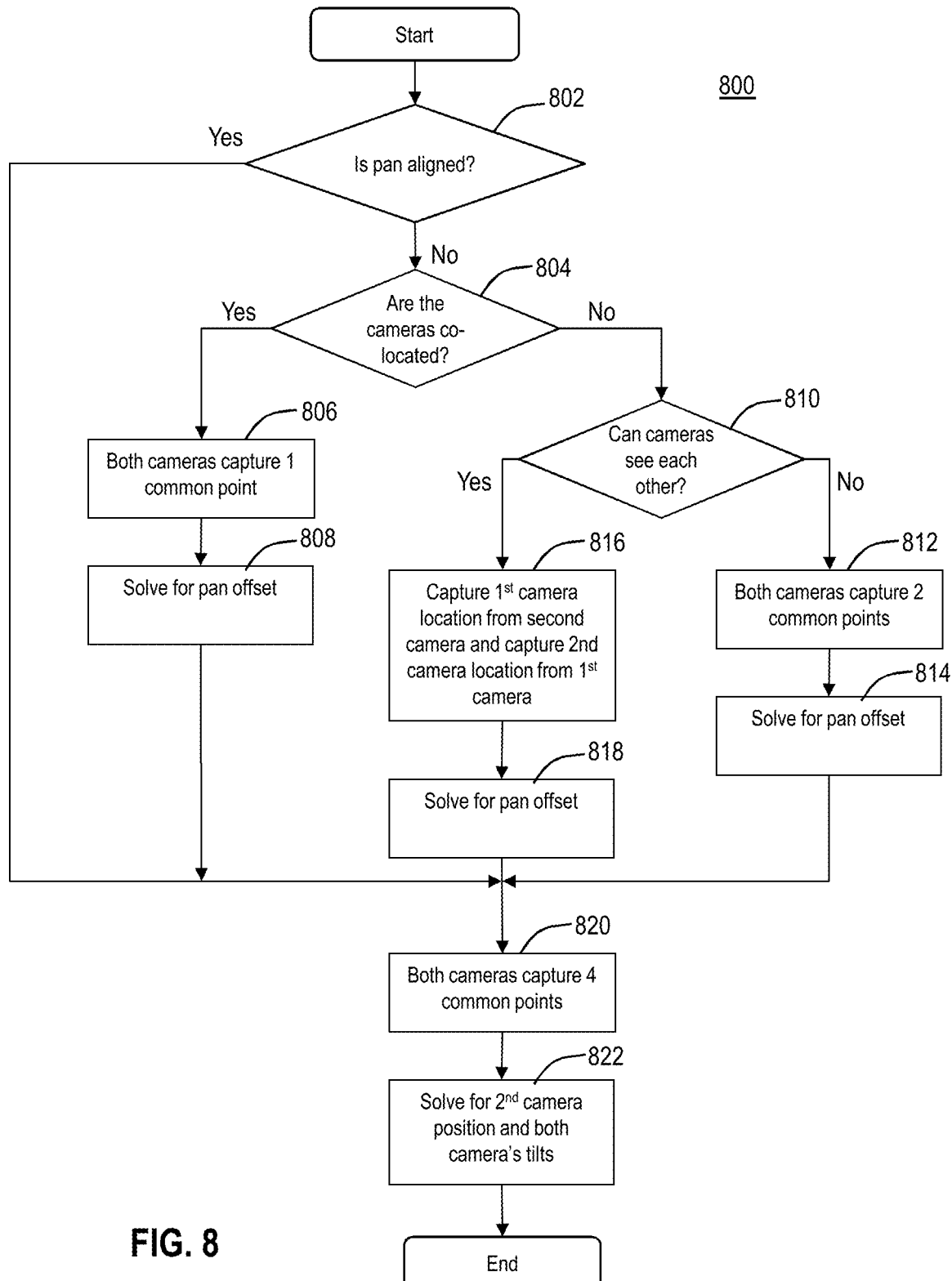
FIG. 8 illustrates an example process by which two or more camera devices can be calibrated for use in a multi-camera tracking application in accordance with a further exemplary embodiment of the present disclosure.

FIG. 8 illustrates an example process 800 by which two or more camera devices can be calibrated (or aligned) for use in a multi-camera tracking application in accordance with a further exemplary embodiment of the present disclosure. For the purposes of explanation, the process 800 can be implemented under control of one or more computer systems.

In this example, the calibration process 800 can determine unknown alignment parameters so that a second camera device can accurately track an object identified from the video stream of the first camera device. In this embodiment, there are a total of 8 unknown alignment parameters to be determined, e.g., the pan offset for the second camera device (1 parameter), the position for the second camera device (3 parameters: X, Y, Z), and the mount tilts for the first and second camera devices (4 parameters: X, Z rotation angles for each camera device). For some camera installations, the offset and position calibrations may be sufficient to operate a dual camera tracking function. The camera mount tilts calibration may be required for installations where one or both of the camera devices are mounted with a significant tilt or where the ground plane has a significant tilt.

The calibration process 800 evaluates common calibration points to determine one or more of the alignment parameters. A common calibration point may be a point on the ground plane (or level) that can be seen by both the first camera device and the second camera device. The pan/tilt angles of one or more common calibration point(s) as viewed from each camera device can be used in the calibration process. In this example, each of the common calibration points lie on the ground plane and are preferably spread out (e.g., none of the points are close to each other) in the view of the first camera device. The common calibration points are visible to both camera devices. To facilitate such visibility, a guide can be provided in the camera display views marking a recommended region(s) where each common point may, should or must be selected (also referred to as "guide marking region"). The user can thereafter make point selections inside or outside of the recommended guide marking region(s) accordingly.

The process 800 begins with an evaluation of the pan for the first and second camera devices to determine a Pan Offset (e.g., Pan Offset calibration operations). For example, at reference 802, a determination is made whether the pan is aligned for the first and second camera devices. If so the process 800 proceeds to reference 820 for further processing using common calibration points (as discussed further below).

Otherwise, if the pan is not aligned, then the pan offset is determined depending on the camera installation. The pan angles of each of the first and second camera devices are aligned so that both camera devices can use the same pan angle to look at the same direction. A pan offset can be added to the pan angle used for the second camera device to accomplish this alignment. For example, at reference 804, a determination is made on whether the first and second camera devices are co-located. If so, one common calibration point on both the image or video stream of the first and second camera devices are identified, at reference 806. At reference 808, the pan offset is determined based on the identified common calibration point. For both camera devices mounted at the same location, both camera devices are pointed at a common object. The pan offset can be determined by taking the difference between the pan angles of the first camera device and the second camera device. The process 800 thereafter proceeds to reference 820 for further processing using common calibration points (as discussed further below).

If the camera devices are not co-located, a determination is made on whether the first and second camera devices can see each other at reference 810. If not, two common calibration points at a ground plane or level on both the image or video stream of the first and second camera devices are identified, at reference 812. At reference 814, the pan offset is determined based on the identified common calibration points. For example, the pan offset can then be calculated by solving a set of geometric equations using the two common calibration points. The process 800 thereafter proceeds to reference 820 for further processing using common calibration points (discussed further below).

If the camera devices are capable of viewing each other at reference 810, the first camera device is operated to capture a location of the second camera device and the second camera device is operated to capture a location of the first camera device. That is, the first and second camera devices are pointed at each other, at reference 816. At reference 818, the pan offset is determined based on the captured locations of the first and second camera devices. For example, the pan offset is the difference between the pan angles of the first and second camera devices minus 180 degrees. The process 800 thereafter proceeds to reference 820.

At reference 820, four common calibration points are identified from the image or video stream of each of the first and second camera devices.

At reference 822, the position of the second camera devices (e.g., X and Z position) and the orientation (e.g., tilt angles) for both the first and second camera devices are determined using the identified common calibration points.

In one example, the OpenGL coordinate system can be adopted to define the global coordinate system of the multi-camera tracking system. The pan angle of the first camera device can be set equal to zero (e.g., pan angle=0) to define the X axis. The X,Z position of the first camera device can be defined as 0,0. The height, Y, of the first camera device can be defined as 1.0. The object of this calibration is to solve for the X, Y, Z position of the second camera device. In the case of co-located camera devices, the X,Z location of the second camera device is the same as the first camera device, or 0,0. The height, Y, of the second camera device can be calculated from the common calibration point already obtained in the pan offset calibration operations, provided that the point was on the ground plane. In the case of separated camera devices, besides the "point at each other" points used for the Pan Offset calibration operation, a single common calibration point in the ground plane can also be used to calculate the position of the second camera device. In the case of separated camera devices (which are unable to view each other), the location of the second camera device can be calculated from the 2 common calibration points already obtained in the Pan Offset calibration step.

A numeric solver can also be used to determine the unknown positions of the second camera device, such as when the tilts of the camera devices may also need to be captured. This tilt calibration can determine the amount of mounting tilt of each camera device about the X and Z axis. However, this calibration may not be necessary in most cases, unless there is for example significant camera mounting tilts or significant ground plane tilt. In the case of a fixed head for the first camera device, the method to determine the camera mount tilts can involve capturing 4 common calibration points, and then using a Limited Broyden-Fletcher-Goldfarb-Shanno (LBFGS) numeric solver (or other numeric solvers can also be used) to solve for the position of the second camera device and the tilt parameters of the first and second camera devices (e.g., 7 unknowns). The pan offset calibration is previously performed. Since this approach includes solving for the position of the second camera device, the geometric methods to solve the position of the second camera device are unnecessary In the case of a non-fixed head of the first camera device, it may not be possible to calibrate the pan offset of the second camera device using the geometric methods outlined above due to the large head tilt angle of the first camera device that can be adjusted on cameras with non-fixed heads. For this reason, the pan offset of the second camera device can be calibrated along with the other 7 unknown parameters (for a total of 8 unknowns) using the numeric solver and requiring 4 common calibration points to be captured/selected.

When a numeric solver is used in the calibration process 800, a calculation can be made to determine how well the solver reached its target. For example, the calculation can determine or reflect a solver error value, which can be converted to a calibration quality value (or score). This quality value can be displayed to the user at the end of the calibration process as an indication to the calibration accuracy that was achieved. If the quality value is below a predetermined threshold, the user can be directed to retry the calibration process in order to improve the quality value. In the retry, the user can try selecting different common calibration points or use more accuracy when selecting the common calibration point locations.

The calibration accuracy can also be verified by providing the user with a "point-to-click" feature on the camera devices through a user interface. This feature allows the user to click on a point in the display view from the first camera device which will cause the second camera device to move so as to point at the equivalent point which is the same function it uses when tracking an object. The user can verify the accuracy of the calibration by observing how accurately the second camera device moves to the equivalent point selected on the first camera device. If the accuracy is insufficient, the calibration process 800 (or parts of the process) can be repeated.

Furthermore, the process 800 can be performed through a cloud-based application, through which the user on a computer system can connect with the two camera devices using a browser, in order to setup and enable an auto operator function that allows one camera device to drive and control another camera device, and to calibrate the two or more camera devices for multi-camera tracking. The various operations of the process 800 can be implemented through a computer system, such as one of the camera devices, a computer system operated by a user, other systems on the VSS or a combination thereof in a distributed manner. Furthermore, in an alternate embodiment, the four common calibration points can be used by a numeric solver to solve for all 8 unknowns including the pan offset of the second camera device. There can also be more or fewer alignment parameters for calibrating the camera devices.

Figure 9:
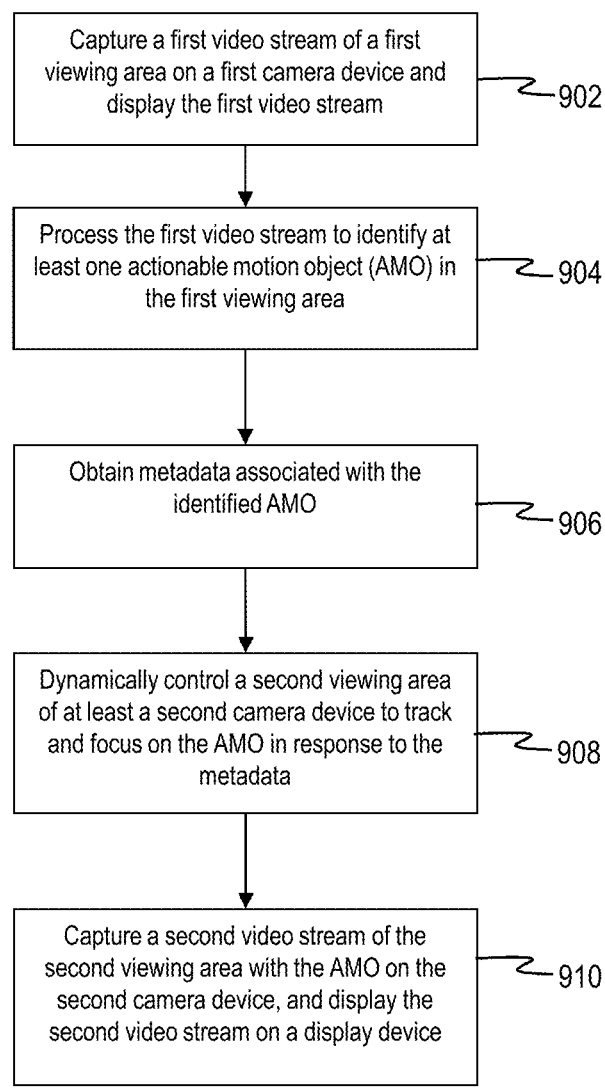
FIG. 9 illustrates an example process by which a first camera device can dynamically drive or control one or more second camera devices in accordance with an exemplary embodiment of the present disclosure.

FIG. 9 illustrates an example process 900 by which a first camera device can dynamically drive or control one or more second camera devices in accordance with an exemplary embodiment of the present disclosure.

At reference 902, the first camera device is operated to capture a first video stream of a first viewing area, and the captured first video stream is transmitted for display on a display device.

At reference 904, the first video stream is processed to identify at least one actionable motion object (AMO) in the first viewing area.

At reference 906, metadata is obtained which is associated with the identified AMO. The metadata can be coordinates (e.g., motion tracking coordinates or other motion analytic information) and/or other information related to the AMO(s). The metadata is transmitted to the second camera device.

At reference 908, a second viewing area of the second camera device is dynamically controlled to track and focus on the AMO(s) in response to the metadata. The second viewing area can change as new metadata is received for the AMO(s) or new AMO(s).

At reference 910, the second camera device is operated to capture a second video stream of the second viewing area, and the captured second video stream is transmitted for display on a display device or storage on a video server.

The process 900 can be configured as part of an auto operator feature to automatically or independently provide multi-camera tracking through the first and second camera devices. Although a two-camera tracking operation is described above, the first camera device can dynamically drive or control multiple second camera devices to obtain different views or perspectives of the same or different AMOs. The captured video stream from the first and second camera devices can be displayed on a user computer system, such as for example through a cloud-based application. The various operations of the process 900 can be implemented on the camera devices, or on the camera devices in combination with connected or networked computer systems in a distributed manner. For example, the motion analytics and translation of coordinates can be performed on the first camera device, the second camera device, or a computer system(s) in communication with the camera devices.

Furthermore, the process 900 may be performed with a plurality of second cameras in which metadata for an AMO is transmitted to those second camera devices which are able to capture video of the AMO in their field of view. Thus, metadata for different AMOs may be transmitted to different ones or combinations of the second camera devices for tracking.

IV. Dual Camera Tracking Example

FIGS. 10 through 15 illustrate an example of the views captured by first and second camera devices in which the first camera device can dynamically drive or control a second camera device to track and focus on a moving object(s) identified from the view of the first camera device in accordance with an exemplary embodiment of the present disclosure. In this example, the first and second camera devices can be co-located, such as mounted on a corner of a building overseeing a parking lot (e.g., the system of FIG. 2).

As shown in FIG. 10, the first camera device detects an AMO, e.g., a first car, which is driving into a parking lot. The first camera device dynamically controls the viewing area of the second camera device to track and focus on the first car according to motion analytic information transmitted to the second camera device, such as shown in FIGS. 11 and 12. As shown in FIG. 12, the viewing area of the second camera device is controlled to zoom-in and focus on the first car as it parks.

While the first car is parked, the first camera device detects another AMO, e.g., a second car, entering the parking lot, and motion analytic information about this second car is transmitted to the second camera device accordingly. The second camera repositions its viewing area to track and focus on both the parked first car and the second car as shown in FIG. 13, in response to the analytic information.

Thereafter, the first camera device detects two new AMOs, e.g., a first person from the first car and a second person from the second car, and continues to drive or control the viewing area of the second camera device as shown in FIGS. 14 and 15 to track and focus on the two people until they enter the building.

V. Camera Link Example

Figure 16:
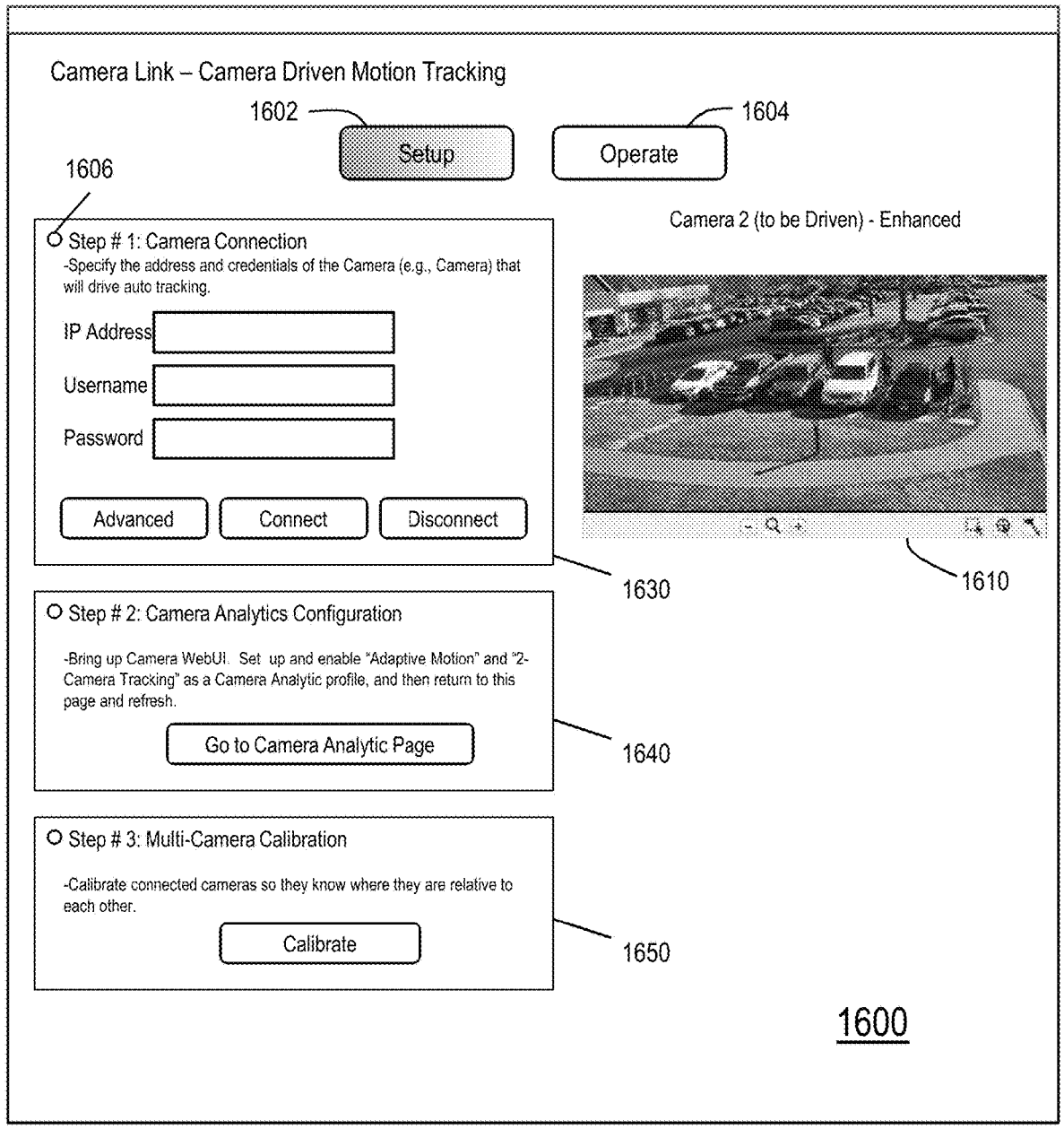
FIGS. 16 through 30 illustrate example computer or user interfaces through which to setup two or more camera devices for multi-camera calibration and tracking in accordance with an exemplary embodiment of the present disclosure.

FIGS. 16 through 30 illustrate screen shots of example user interfaces through which to implement camera link operations to setup two or more camera devices for multi-camera calibration and tracking in accordance with an exemplary embodiment of the present disclosure. a user can initiate the camera link operations through a computer system, which is configured to communicate with camera devices, e.g., a first and second camera device. In this example, a user can establish a connection with the second camera device through a computer system, which in turn provides a user interface (UI) 1600 as shown in FIG. 16. The UI 1600 is provided to setup and implement auto tracking (e.g., tracking through an auto operator) on the second camera device with one or more first camera devices.

For example, the UI 1600 can include graphical buttons 1602 and 1604 to initiate a Setup operation to link and align at least one first camera device to the second camera device and to Operate the linked camera devices to perform auto tracking. A display window 1610 is provided to display a current viewing area of the second camera device, which has been selected to be driven, and can include graphical inputs (e.g., for zooming, selecting sub-regions in the window, and so forth). The UI 1600 can be a web user interface or other interface provided through an application, such as a cloud-based application.

In this example, there are three steps to install, enable, and verify that auto tracking is working, through sub-interfaces 1630, 1640 and 1650 of the UI 1600, respectively. In Step one, a connection can be established between a first camera device (e.g., the driving camera device) and a second camera device (e.g., the driven camera device). In Step two, adaptive motion analytic detection is setup for the first camera device. In Step three, the camera devices are calibrated to produce the alignment parameters, which are stored to provide the location of the second camera device relative to the first camera device. After setup, the camera link feature can provide controls to verify that the camera devices are aligned correctly to perform auto tracking within an operating threshold (discussed further below). Before setting up camera link, the first and second camera devices are turned ON and checked to ensure that camera operations are within normal operating parameters. At this stage, the status indicator 1606 for the sub-interfaces 1630, 1640 and 1650 for each Step can be red or any other color or pattern indicating that the step(s) is not completed or verified. When a Step is completed or verified, the status indicator for that step can turn green or any other color or pattern reflecting such completion or verification. For example, all the status indicators 1606 for the three steps turn green when the first and second camera devices are linked and ready to operate together.

Figure 17:
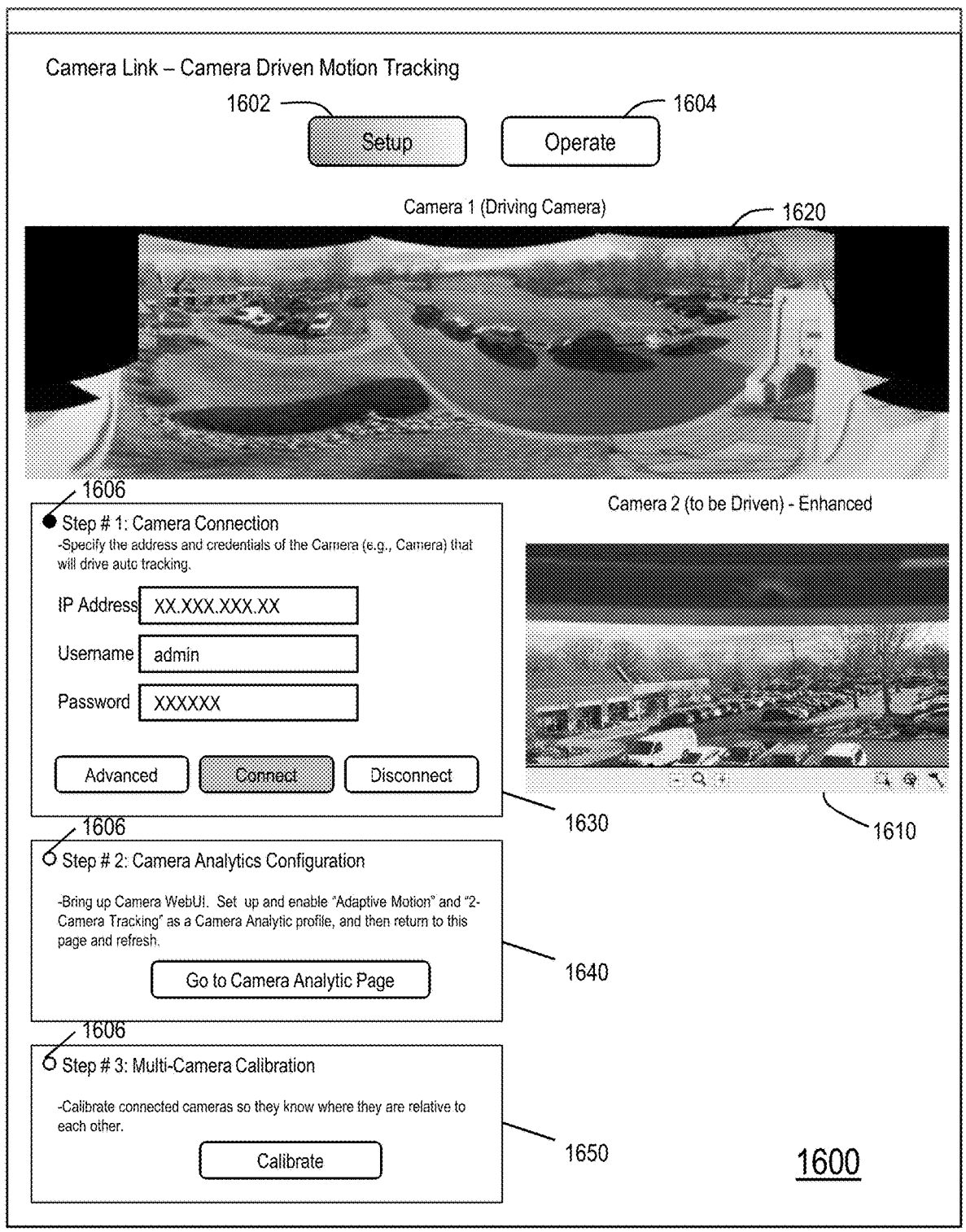

As shown in FIG. 17, a user can initiate Step one to establish a connection between the first camera device and the second camera device through the sub-interface 1630. For example, the user can enter the IP address for the first camera device, a user name and a password, and then select the Connect graphical button to initiate a connection operation to the first camera device. In this example, a connection has been established with the first camera device, and the current viewing area of the first camera device is shown in a display window 1620 as a wide-angle view such as a panorama view. The graphical button Advanced can be used to initiate additional configuration settings for connecting with the first camera device, and the graphical button Disconnect can be used to terminate the connection with the first camera device.

Once Step one is completed, the status indicator 1606 will reflect the completed status. Thereafter, a user can continue with Step two through the sub-interface 1640 to initiate a camera analytic configuration through the graphical button "Go to Camera Analytic Page". The camera analytic configuration allows a user to create camera analytic profiles associated with motion (or object) tracking on the first camera device, such as shown in user interface 1800 in FIG. 18.

Figure 18:
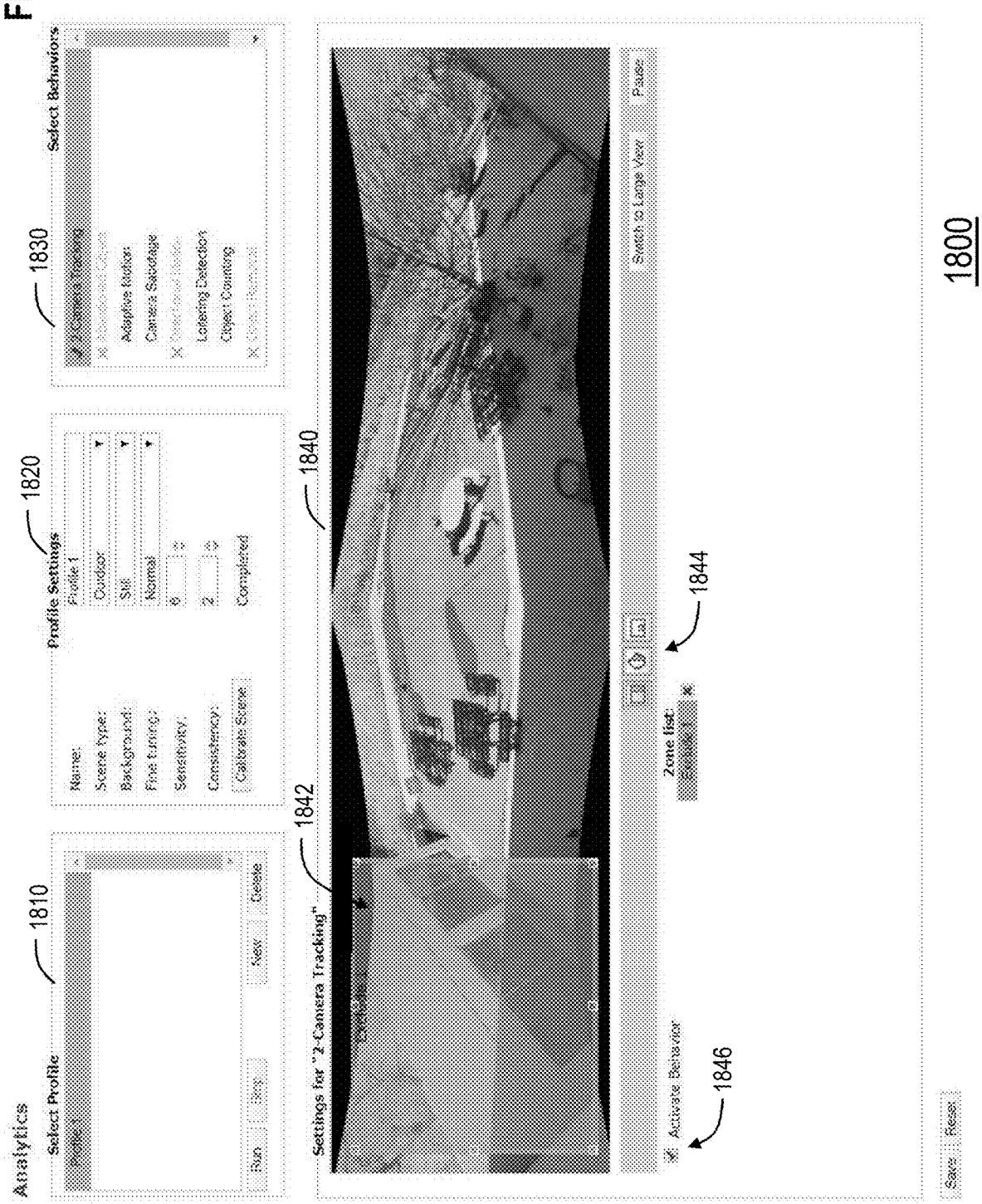

As shown in FIG. 18, a UI 1800 is provided to configure the camera analytics, such as for motion tracking on the first camera device. The UI 1800 can include various graphical inputs (e.g., pull down boxes, buttons, or other known inputs) to allow user selection of various analytic parameters to be configured. In this example, the UI 1800 includes Select Profile 1810, Profile Setting 1820, Select Behavior 1830 and a display window 1840 which displays a viewing area of the first camera device in a panorama view. The Select Profile 1810 allows a user to create a new analytic profile, to select an existing analytic profile (see, e.g., Profile 1), to delete an analytic profile or to run an analytic profile. In this example, a user is configuring the analytics for the Profile 1.

The Profile Setting 1820 allows a user to select various analytic parameters, such as Scene Type (e.g., outdoor, indoor, etc.), Background (e.g., Still, Noisy, etc.), Fine Tuning (e.g., Normal, Aggressive, Conservative, etc.), Sensitivity (e.g., sensitivity for object detection between 1-10 with 10 being the highest sensitivity level and 1 being the lowest sensitivity), Consistency, and so forth. A higher consistency number ensures an object is moving in the same direction for a longer period of time. The higher the consistency number the better the analytic will ignore randomly moving objects such as tree leaves and wind motion.

Figure 19:
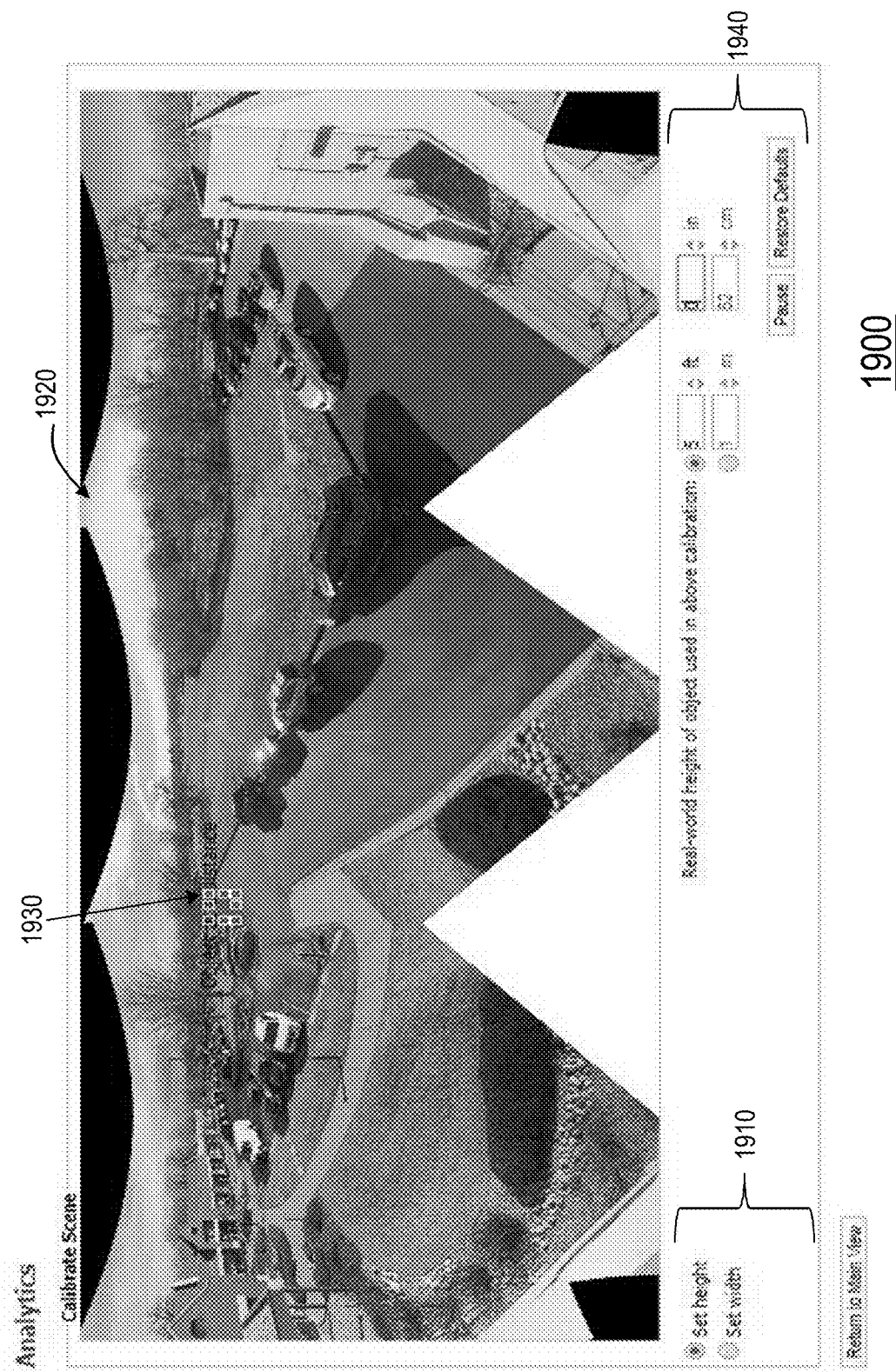
Figure 20:

The Profile Setting 1820 also allows a user to initiate calibration for a scene (e.g., using the Calibration button), which will bring up a scene calibration interface 1900 (e.g., a calibration page), such as shown in FIGS. 19 and 20. As shown in FIG. 19, the user can configure the height at reference 1910 in the scene of the first camera device by placing a box 1930 at a distant point in the displayed view 1920 and adjusting the height of the box to match the height of a typical object at that distance. If needed, the height can be entered in the entry box at reference 1940. As further shown in FIG. 20, the user can configure a width at reference 1910 in the scene of the first camera device, and can position and adjust the length of the bars 1950 of a typical object at a close distance and at a far distance as shown. The user can then return to the UI 1800 (e.g., analytic page) in FIG. 18 using a Main View button, when scene calibration has been completed. As shown in FIG. 18, the Profile Setting 1830 can indicate the status information on a Calibration Scene (e.g., Completed, etc.).

As further shown in FIG. 18, the Select Behavior 1830 allows a user to select an operational behavior associated with the profile, such as for example 2-Camera Tracking, Abandoned Object, Adaptive Motion, Camera Sabotage, Directional Motion, Loitering Detection, Object Counting, Object Removal and so forth. In this example, at least 2-Camera Tracking has been selected.

Figure 21:
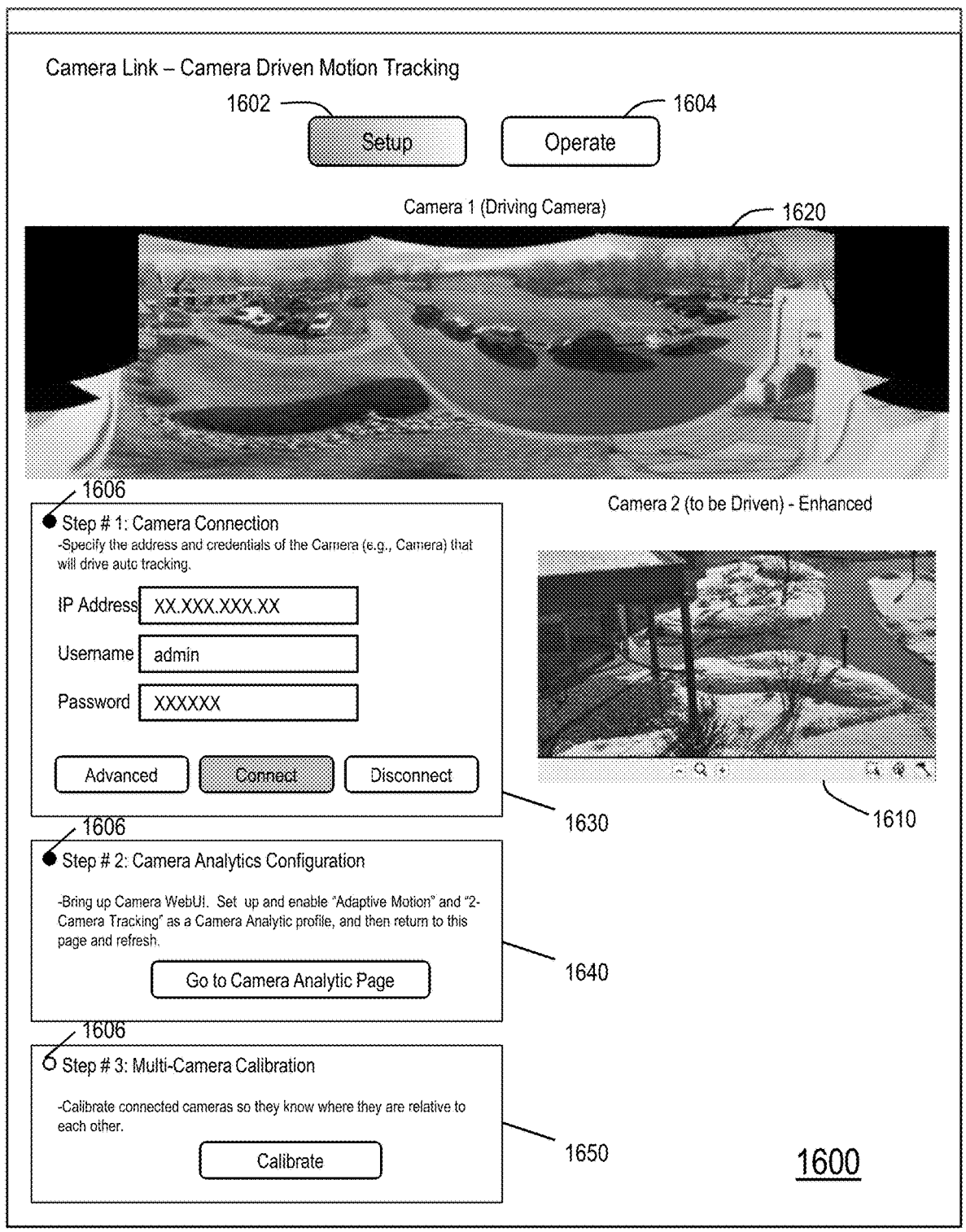
Figure 22:

The display window 1840 is provided to allow the user to configure the settings for the selected 2-Camera Tracking. A user can employ various graphical inputs 1844 to set various tracking parameters for this behavior, such as exclusion zone(s) 1842 (e.g., Exclude 1). In general, the camera analytic can detect motion over an entire scene covered by a viewing area of the first camera device. However, if desired, a portion of the scene can be excluded from the analytic, by setting exclusion zone(s) 1842. For example, a portion of the scene may provide a view of an inside of a building through its windows. If only motion over an outside region such as a patio is desired, excluding the building's windows is possible using the exclude zone graphical tools. As shown, a user can set the dimensions of each exclusion zone 1842. The Window 1840 also allows the user to switch between a smaller or larger view, pause a live video feed from the first camera device, and configure other settings for the motion analytic to be implemented on the first camera device. Once the 2-camera Tracking settings are completed, the user can select to activate the configured behavior at reference 1846. Once all the analytic setting are completed, the user can Save the profile or Reset to start over with the profile settings. The profile can be saved on the memory of the first camera device as well as backed up in memory at other locations. The user can set the first camera device to operate according to the saved profile by selecting the Run button on the Select Profile 1810. Thereafter, the user can select the Return button to return to the UI 1600 as shown in FIG. 21 in which the status indicator 1606 shows that Steps one and two have been completed. The user can now proceed to Step three to initiate calibration (or alignment) by selecting the Calibrate button on the sub-interface 1650, which brings the user to the calibration interface UI 2200 as shown in FIG. 22.

In Step three, the position of the second camera device can be calibrated relative to the first camera device by matching common calibration points in a motion plane (e.g., a ground plane or a plane parallel to the ground plane) on both the video from the first camera device and the second camera device. No physical dimensions or angles are necessary even when using the camera link feature with camera devices that are not mounted together. Calibration can be implemented when first turning on the camera link feature. After calibration, the geometry, which can be represented as alignment parameters, can be stored in the second camera device, notwithstanding changes to the mounting position of the camera devices. Each second camera device can store the geometry for a plurality of first camera devices so a user can easily switch between different first camera devices to drive the second camera device.

A step-by-step example of the calibration operations will be described below with reference to the UI 2200 in FIGS. 22 through 27 in the context of a parking lot example. As shown in FIG. 22, the UI 2200 includes a panorama view 2240 from the first camera device, an immersive view 2250 from the first camera device, and an enhanced view 2260 from the second camera device. The immersive view 2250 can display a zoomed in view of a region displayed in the panorama view 2240.

To start the calibration process, the user can select a mount-type of the camera devices at reference 2210 and mutual visibility of the camera devices at reference 2220 on the UI 2200. Mutual visibility means that the second camera device is visible in the view of the first camera device, and that by adjusting the pan and tilt of the second camera device the first camera device is visible in the view of the second camera device. If the camera devices are mounted together, neither camera device is visible to the other. If the camera devices are mounted separately, each camera device may be viewable by the other camera device. After answering the two questions, the user can select the Next button to proceed to the next calibration steps implemented through the UI 2200 as shown by FIGS. 23 through 26 to select common calibration points, e.g., four common points in this example, on the video from the first camera device and the video from the second camera device. The common calibration points can be in the plane of motion that the first camera device will track, such as on the ground or floor of the scene. This plane, however, can be a tilted plane relative to the earth, e.g., the parking area could be on a hillside.

Figure 23:
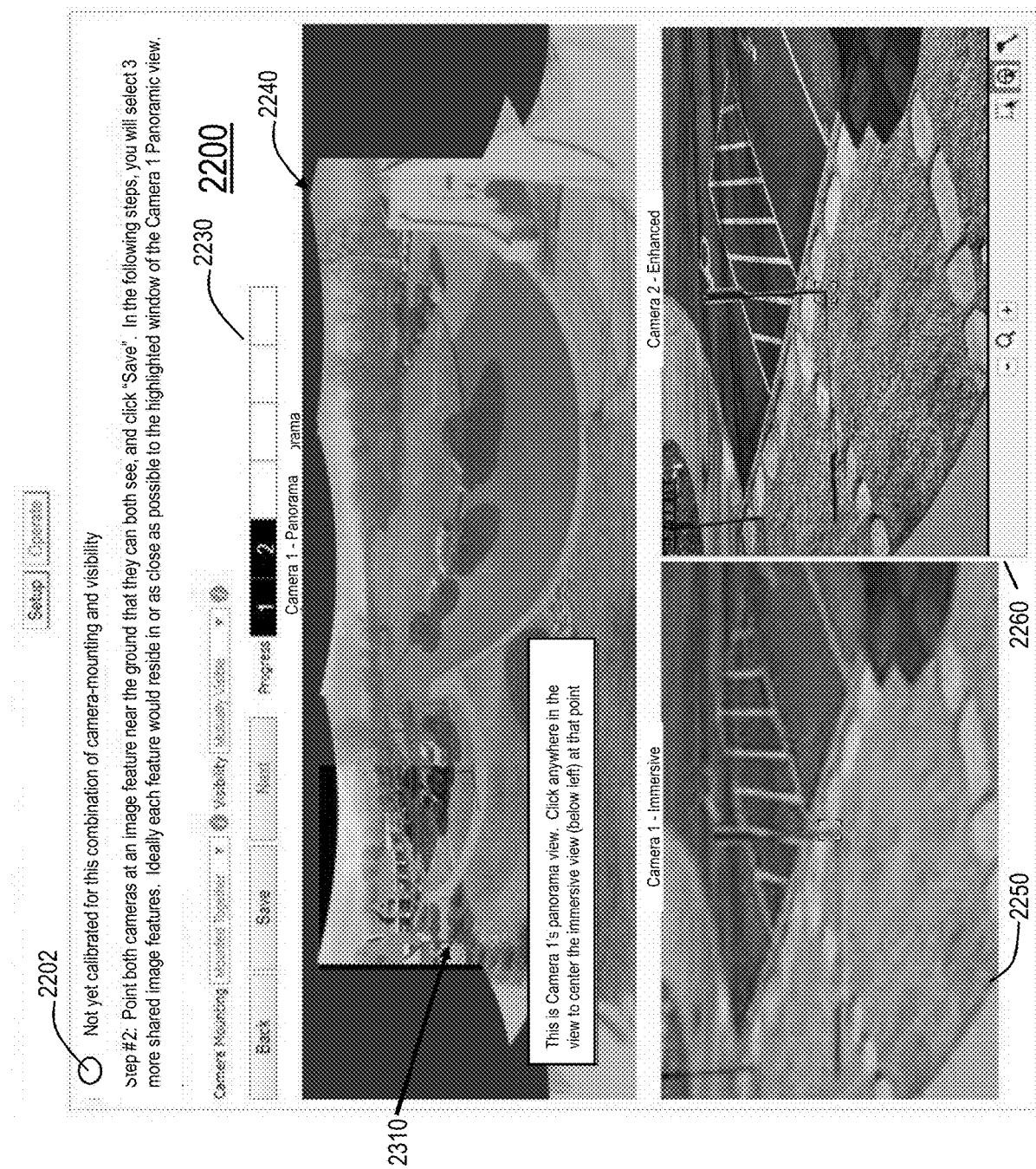
Figure 24:
Figure 25:
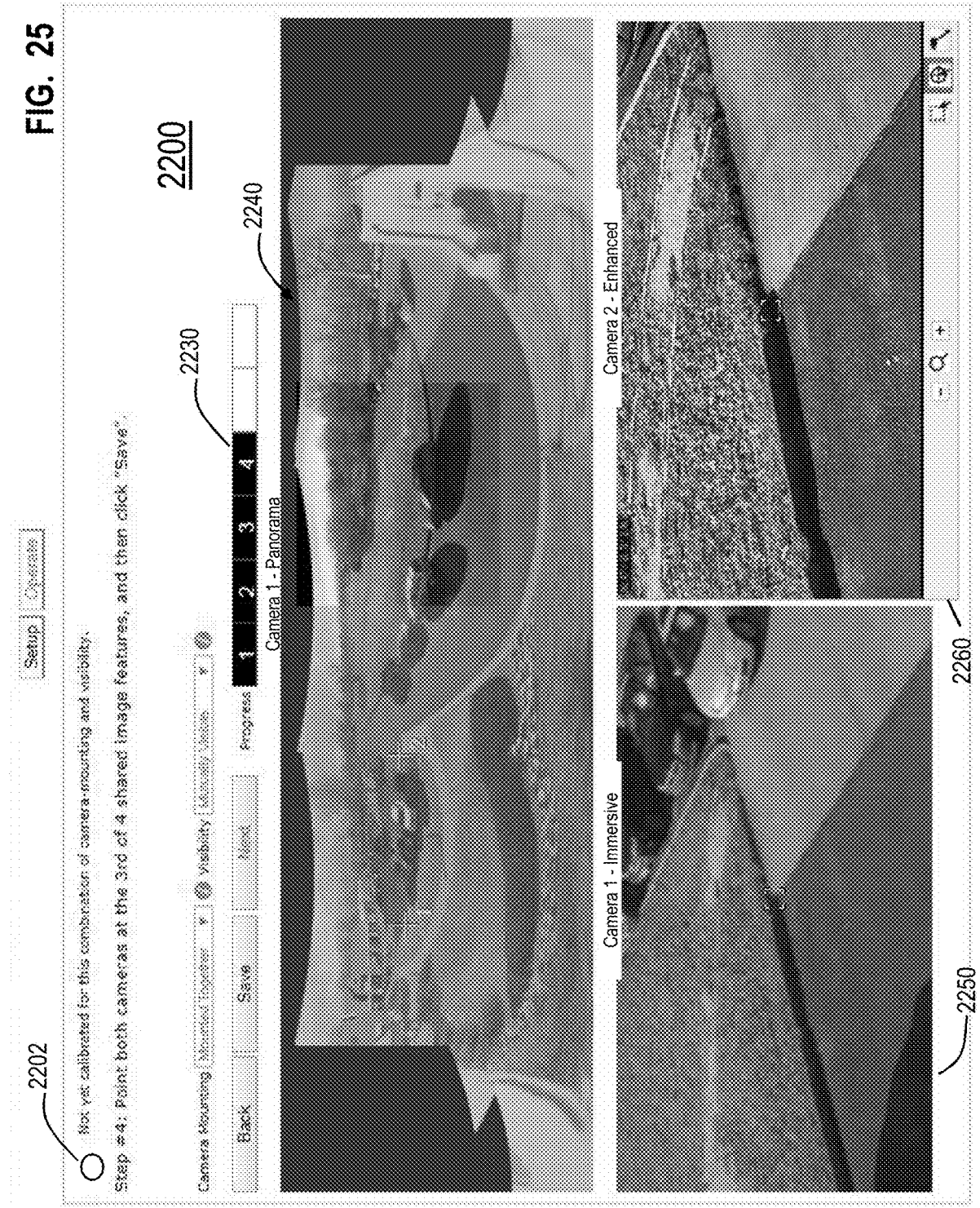
Figure 26:
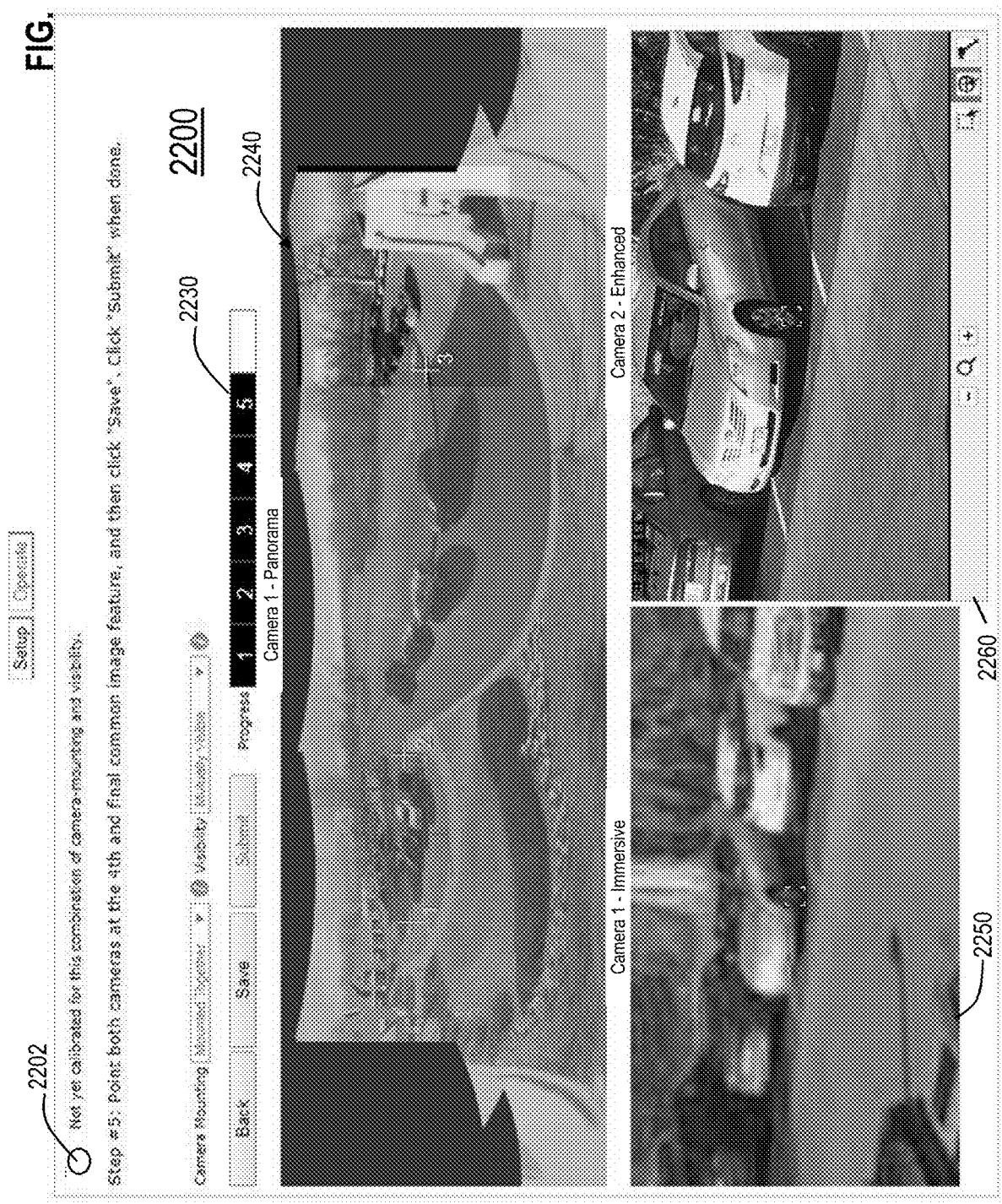
Figure 27:

For example, in FIG. 23, the base of a sign post is selected on the UI 2200 as the first common calibration point from both the immersive view 2250 of the first camera device and the enhanced view 2260 of the second camera device. As further shown in FIG. 23, the panorama view 2240 for the first camera device can designate recommended region(s) 2310 for selecting a common calibration point (e.g., region(s) which are not shaded or blocked out). In FIG. 24, a crack in a curb in the parking lot is chosen on the UI 2200 as the second common calibration point in the immersive view 2250 of the first camera device and the enhanced view 2260 of the second camera device. In FIG. 25, another crack in a curb in the parking lot is chosen on the UI 2200 as the third common calibration point in the immersive view 2250 of the first camera device and the enhanced view 2260 of the second camera device. Finally, in FIG. 26, a bottom of an automobile tire is chosen on the UI 2200 as the fourth common calibration point in the immersive view 2250 of the first camera device and the enhanced view 2260 of the second camera device. As each point is selected and saved, the progression bar 2230 shows the progress in the calibration operation (e.g., from 1 to 2, 2 to 3, etc.). A status indicator 2202 indicates whether calibration is completed or not using a color or pattern scheme (e.g., red=NO, green=Yes, etc.).

In this example, for each point, the matching points are positioned in the center of a box [ ] and saved through the Save button, and the next point can be selected by initiating the Next button until all the points are selected. Careful matching of the points can result in the best calibration results. For the first camera device view, clicking on an input device such as a mouse or the like can center the video, and rolling the scroll wheel can perform a zoom operation. It is also possible to click and drag in the view of the first camera device. For the second camera device, the user can click to center, and use the +/− input to zoom. Furthermore, the recommended regions for selection of each point on the scene in the view 2240 can be spread out from each other in order to spread out the selected points from each other. By spreading out the selected common calibration points from each other in the displayed scene, it is possible to increase the accuracy of the resulting calibration.

After selecting and saving the four common calibration points, the geometry is calculated such as for example by the second camera device (or other computer system). As shown on the UI 2200 in FIG. 27, the status indicator 2202 indicates that calibration has been completed (e.g., turns green or some other predetermined pattern). A calibration score is displayed, along with recommendations if the points provide a good geometrical solution. In this example, a score and recommendation are indicated as follows, e.g., Quality Score 81%: Properly Calibrated. The recommendations can be based on a comparison of the calibration score to a threshold to determine if the calibration is within an acceptable range. The user can change or adjust one or more of the saved common calibration points or redo the entire calibration, and have the geometry recalculated to obtain a calibration with a higher accuracy score. After completing calibration, the user can also select the Setup button to return back to the UI 1600 (e.g., FIGS. 16 and 21), where the status indicators 1606 for each of Steps one, two and three indicate their completion (e.g., green). The user can then modify any setup steps performed, or verify and use the camera link feature, as desired.

Figure 28:
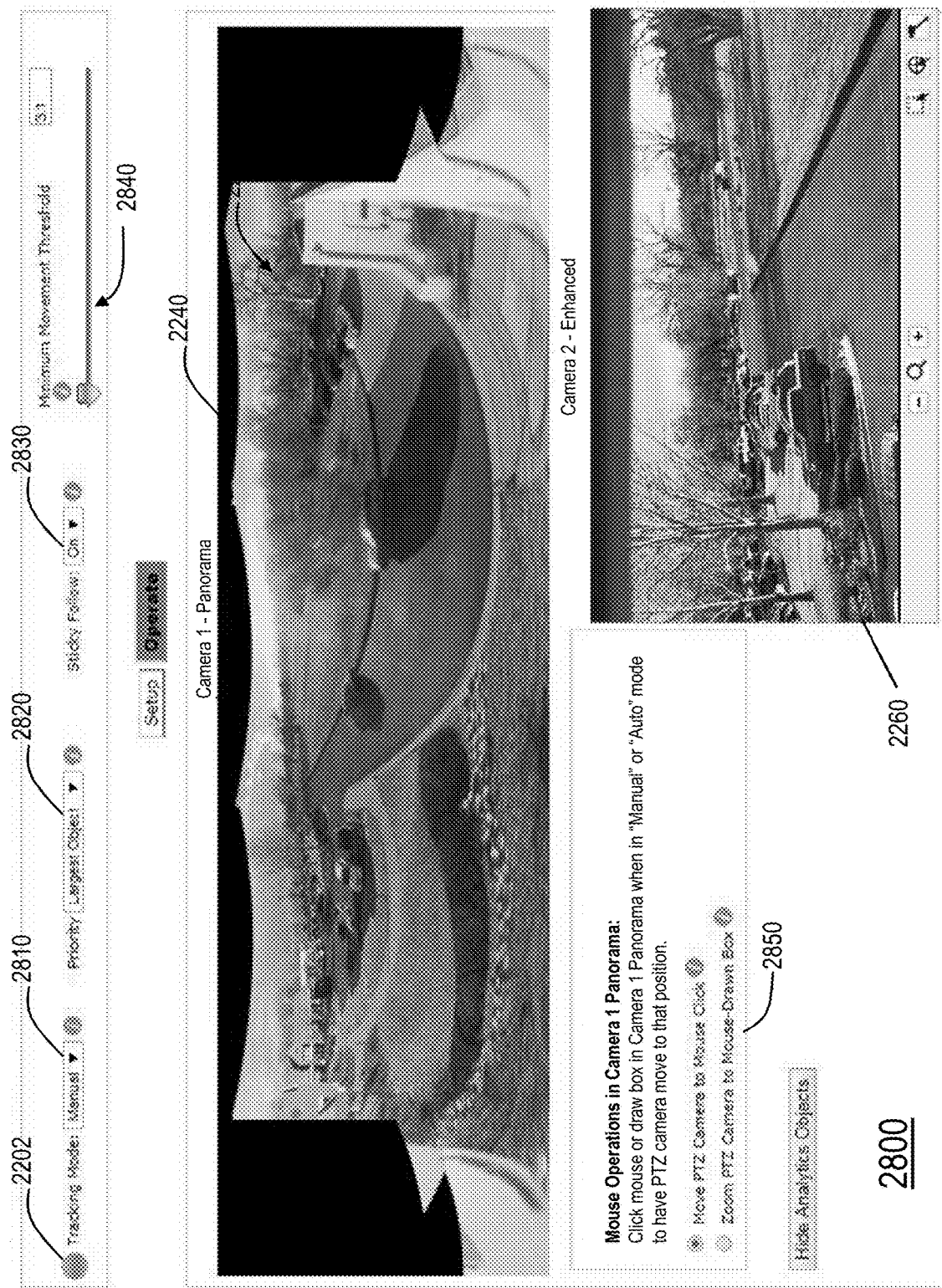
Figure 29:
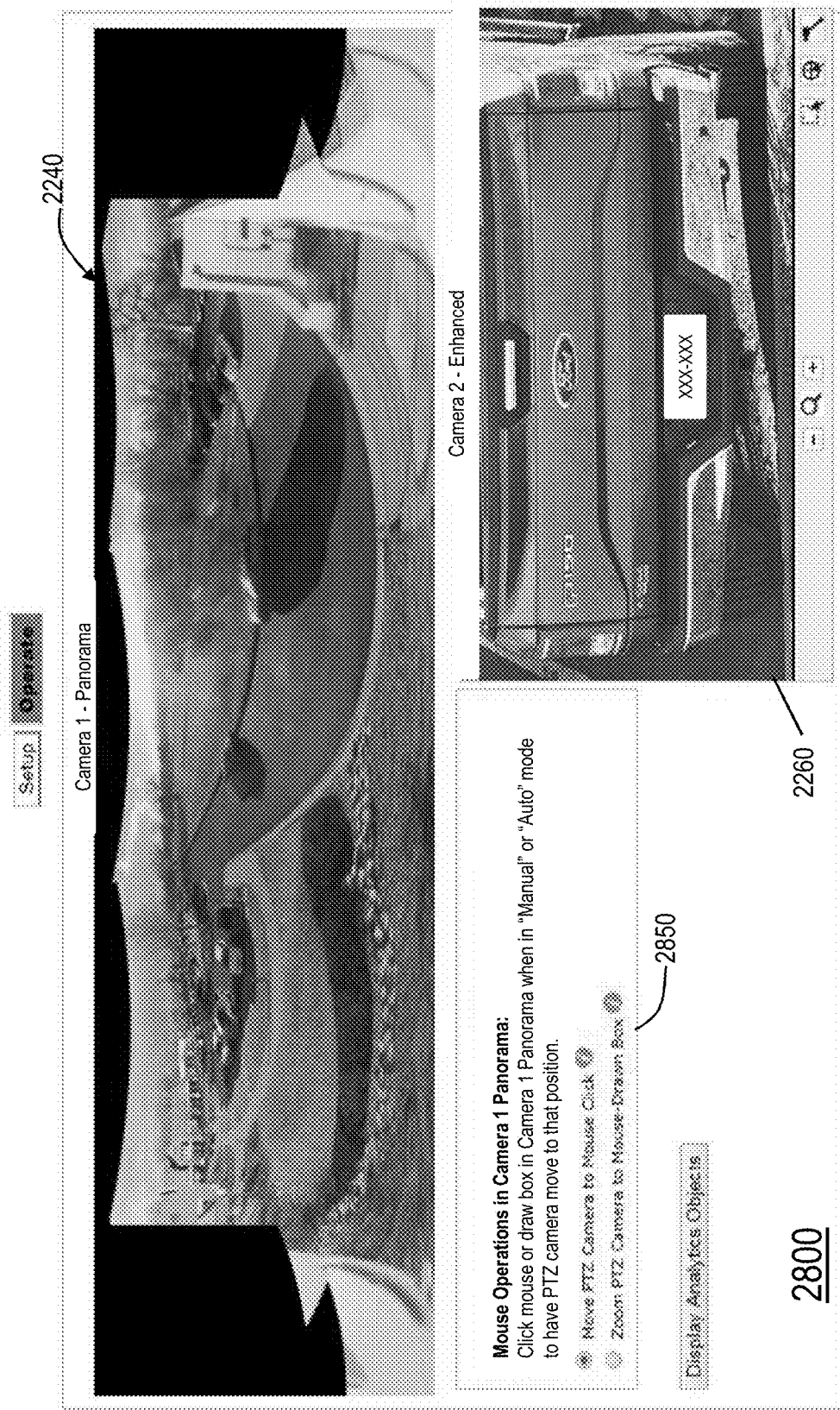

From the UI 1600 (or other UIs), the user can select the Operate button to place the second camera device in a mode where the user can further verify calibration and analytics through UI 2800 in FIG. 28. As shown in the UI 2800, there are several controls for the Operate mode. These controls include a Tracking Mode 2810 to allow Manual Tracking or Automated Tracking. By selecting Manual Tracking, the user can select either Move PTZ Camera to Mouse Click or Zoom PTZ Camera to Mouse-Drawn Box, as shown a reference 2850. To verify good Calibration, the user can select Move PTZ Camera to Mouse Click and click different points in a viewing area, which is displayed in the view 2240 for the first camera device. The viewing area of the second camera device will move to that point and display the video in the view 2260. Selecting Mouse-Drawn Box will position the second camera device at that point and zoom into or out of the view. For example, as shown in the partial view of the UI 2800 in FIG. 29, the user can draw a box on a license plate of a car in the view 2240 for the first camera device, which in turn causes the viewing area of the second camera device to track, zoom and focus on the license plate as displayed in the view 2260.

Figure 30:
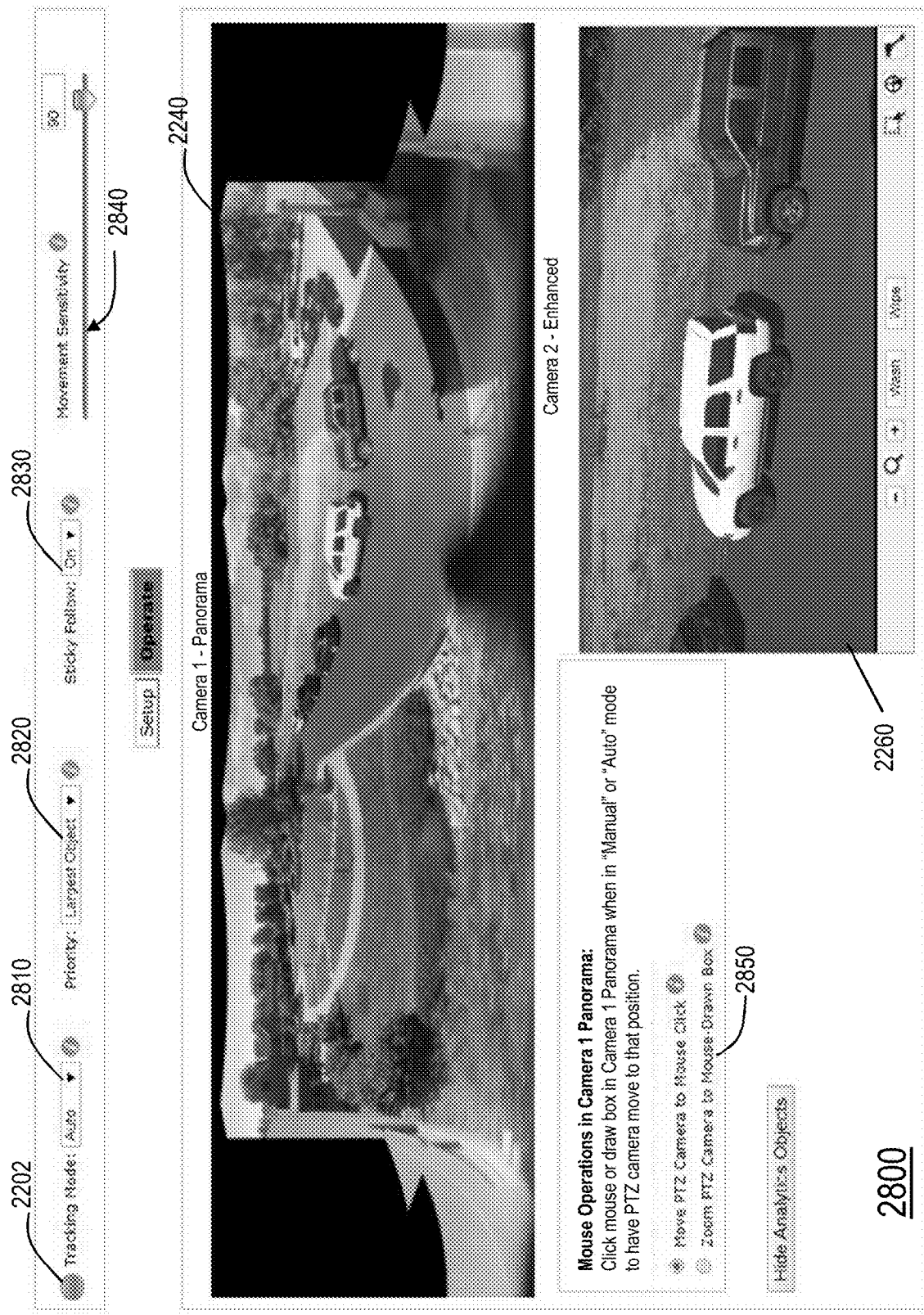

As shown in FIG. 30, the user can also select "Auto" for the Tracking mode 2810. Choosing Auto Tracking Mode enables automatic camera tracking where analytics from the first camera device will drive the second camera device. In general, as the first camera device detects motion, a box (not shown) will show in the video of the first camera device as displayed in the view 2240 and the second camera device will position to show a high magnification view of that motion as displayed in the view 2260. If the first camera device detects multiple moving objects, multiple boxes (not shown) will be displayed. The box that the second camera device is following will show with a red frame in this example. If the user clicks on a box, that box would turn red, become the priority and be the motion object that is tracked.

Three controls allow for additional configuration of the Motion Tracking: Priority 2810, Sticky Follow On and Off 2820 (or Sticky 2820), and Movement Sensitivity 2830. The user can select an analytic detect object that the second camera device will be controlled to follow (e.g., largest, fastest, closest, farthest or other parameter associated with an object to be tracked). The user also can turn ON or OFF the Sticky Follow feature through Sticky 2820. If the Sticky Follow feature is turned ON, the second camera device will be controlled to continue to follow the original object that was detected even if other objects are detected, and even if other objects are larger, faster, etc. The Sticky Follow will cause the second camera device to stay with the original object until it is stationary for some predetermined period of time. The user also can select the sensitivity of the motion through the control for Movement Sensitivity 2830. A high setting will track small motions. A lower setting will disregard small movements such as swaying trees and blowing leaves, and only track large movements such as cars driving and people walking. However, setting too low may disregard people walking and only track faster moving cars.

The camera link set up described above with reference to FIGS. 16 through 30 are simply provided as an example. The UIs, steps, views, order of operation, graphical inputs, colors or patterns and other aspects can be varied to setup and operate multi-camera tracking as described herein.

Figure 31:
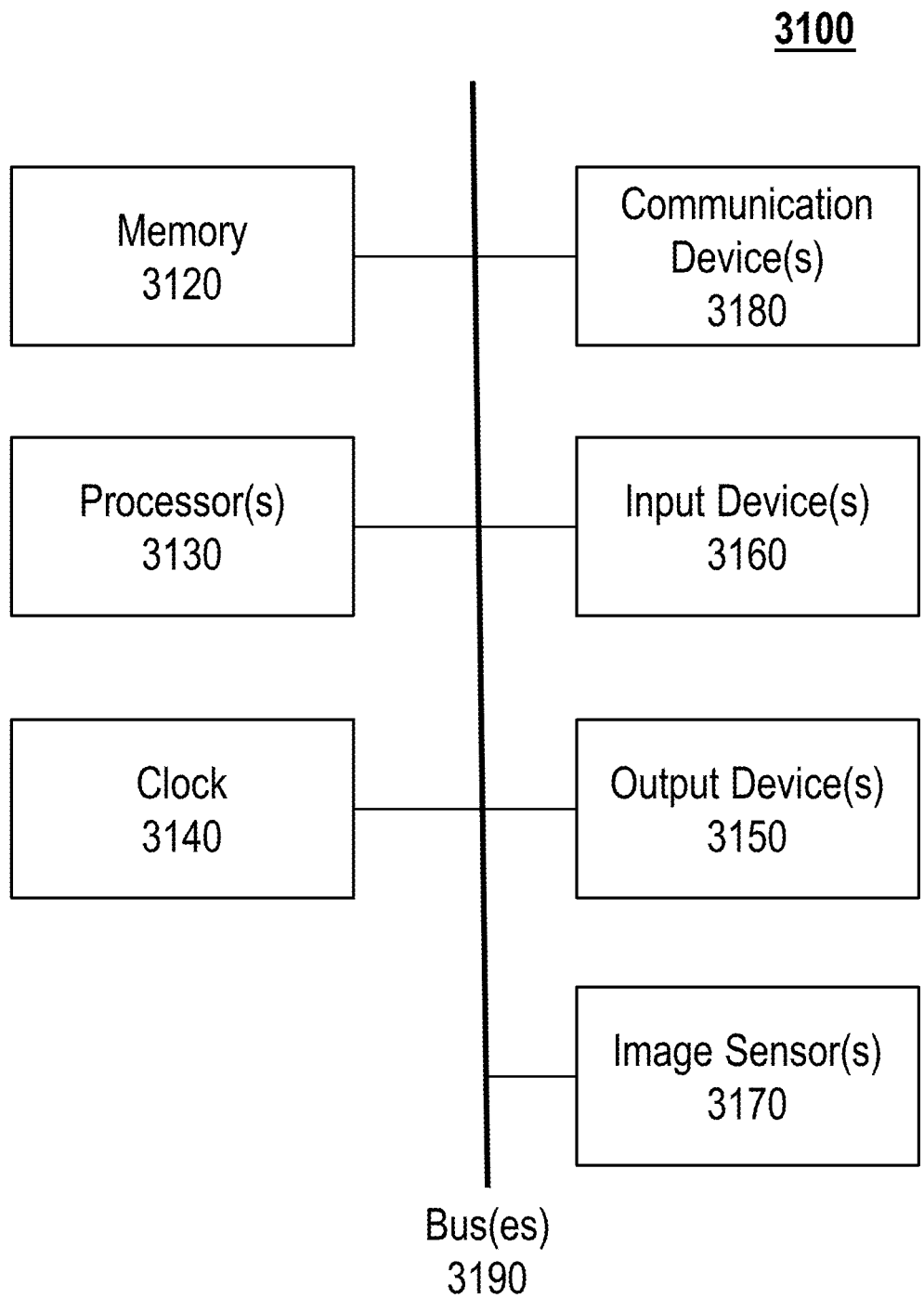
FIG. 31 is a block diagram of example components of a computer system, in accordance with an exemplary embodiment of the present disclosure.

FIG. 31 a block diagram of example components of a computer system 3100, in accordance with an exemplary embodiment of the present disclosure. As shown in FIG. 31, a computer system 3100 can include for example memory 3120, processor(s) 3130, clock 3140, output device 3150, input device 3160, image sensor(s) 3170, communication device 3180, and a bus system 1090 between the components of the computer system. The clock 3140 can be used to time-stamp data or an event with a time value.

The memory 3120 can store computer executable code, programs, software or instructions, which when executed by a processor, controls the operations of the computer system 3100, including the various processes described herein. The memory 3120 can also store other data used by the computer system 3100 or components thereof to perform the operations described herein. The other data can include but is not limited to images or video stream, locations of the camera devices, alignment parameters, AMO criteria including types of AMOs and priority of different types of AMOs, thresholds or conditions, and other data described herein.

The output device(s) 3150 can include a display device, printing device, speaker, lights (e.g., LEDs) and so forth. For example, the output device(s) 3150 may output for display or present a video stream, graphical user interface (GUI) or other data.

The input device(s) 3160 can include any user input device such as a mouse, trackball, microphone, touch screen, a joystick, control console, keyboard/pad, touch screen or other device operable by a user. The input device 3160 can be configured among other things to remotely control the operations of one or more camera devices, such as pan, tilt and/or zoom operations. The input device(s) 3160 may also accept data from external sources, such other devices and systems.

The image sensor(s) 3170 can capture images or video stream, including but not limited to a wide view or a panoramic view. A lens system can also be included to change a viewing area to be captured by the image sensor(s).

The processor(s) 3130, which interacts with the other components of the computer system, is configured to control or implement the various operations described herein. These operations can include video processing; controlling, performing or facilitating the calibration (or alignment) and/or linkage of multiple camera devices for multi-camera tracking; controlling, performing or facilitating object detection and tracking, such as for AMOs, in an image or video stream; transmitting and receiving images or video frames of a video stream or other associated information; communicating with one or more camera devices; controlling or facilitating the control over the operations of one or more cameras devices via commands or signals, analytic information (e.g., metadata) from a camera device or other computer system, or other information; implementing a numeric solver to calculate parameters and other information; or other operations described herein.

The above describes example components of a computer system such as for a computer, server, camera device or other data processing system or network node, which may communicate with one or more camera devices and/or other systems or components of the VSS over a network(s). The computer system may or may not include all of the components of FIG. 31, and may include other additional components to facilitate operation of the processes and features described herein. The computer system may be a distributed processing system, which includes a plurality of computer systems which can operate to perform the various processes and features described herein.

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof. Furthermore, one or more operations for various processes described herein, including the calibration and auto-tracking processes, may be performed on one of the camera devices or on a processor, computer system or computing device which is external to the camera devices.

It is to be appreciated that the concepts, systems, circuits and techniques sought to be protected herein are not limited to use in applications (e.g., commercial surveillance applications) but rather, may be useful in substantially any application where it is desired to use multiple camera devices for tracking or monitoring objects or things.

It should also be understood that the example embodiments disclosed and taught herein are susceptible to numerous and various modifications and alternative forms. Thus, the use of a singular term, such as, but not limited to, "a" and the like, is not intended as limiting of the number of items.

Furthermore, the naming conventions for the various components, functions, parameters, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

A processor(s) or controller(s) as described herein can be a processing system, which can include one or more processors, such as CPU, GPU, controller, FPGA (Field Programmable Gate Array), ASIC (Application-Specific Integrated Circuit) or other dedicated circuitry or other processing unit, which controls the operations of the devices or systems, described herein. Memory/storage devices can include, but are not limited to, disks, solid state drives, optical disks, removable memory devices such as smart cards, SIMs, WIMs, semiconductor memories such as RAM, ROM, PROMS, etc. Transmitting mediums or networks include, but are not limited to, transmission via wireless communication (e.g., Radio Frequency (RF) communication, Bluetooth®, Wi-Fi, Li-Fi, etc.), the Internet, intranets, telephone/modem-based network communication, hardwired/cabled communication network, satellite communication, and other stationary or mobile network systems/communication links. Video may streamed using various protocols, such as for example HTTP (Hyper Text Transfer Protocol) or RTSP (Real Time Streaming Protocol) over an IP network. The video stream may be transmitted in various compression formats (e.g., JPEG, MPEG-4, etc.)

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A computer-implemented method of tracking one or more objects using multiple camera devices, comprising:
    processing a first video stream, which is captured by at least one first camera device, to identify, from among a plurality of actionable motion objects (AMOs), a first actionable motion object (AMO) that has moved a threshold minimum detection amount;
    generating first metadata associated with the first AMO;
    transmitting the first metadata to at least one second camera device; and
    dynamically controlling a viewing area of the at least one second camera device in response to the first metadata to enable the at least one second camera device to track and focus on the first AMO;
    wherein the first AMO tracked and focused on by the at least one second camera device corresponds to one selected from a group consisting of a fastest moving AMO identified from the AMOs, a farthest AMO from the at least one second camera device which is identified from the AMOs, and a farthest AMO from the at least one first camera device which is identified from the AMOs.

2. The method of claim 1, wherein the processing, generating and transmitting operations are performed by the at least one first camera device.

3. The method of claim 1, wherein the processing, generating and transmitting operations are performed by a computer system which is in communication with the first camera device and the second camera device.

4. The method of claim 1, wherein the metadata comprises coordinates of the first AMO.

5. The method of claim 1, further comprising:
    processing the first video stream, which is captured by at least one first camera device, to identify a second actionable motion object (AMO);
    generating second metadata associated with the second AMO;
    transmitting the second metadata associated with the second AMO to the at least one second camera device; and
    dynamically controlling a viewing area of the at least one second camera device in response to the second metadata to enable the at least one second camera device to track and focus on the first AMO and the second AMO.

6. The method of claim 1, wherein the first AMO tracked and focused on by the at least one second camera device further corresponds to at least one selected from a group consisting of:
    a closest AMO to the at least one second camera device which is identified from the AMOs, and
    a closest AMO to the at least one first camera device which is identified from the AMOs.

7. The method of claim 1, wherein the at least one second camera devices comprises a plurality of the second camera devices, and the first metadata is transmitted to the plurality of the second camera devices, each of the plurality of second camera devices dynamically controlling their respective viewing area in response to the first metadata to enable each of them to track and focus on the first AMO.

8. The method of claim 1, wherein the first metadata associated with the first AMO transmitted to the at least one second camera device comprises coordinate-based move commands to directly control movement of the at least one second camera device.

9. The method of claim 1, wherein at least one of the at least first camera device and the at least one second camera device group any detected AMOs that are close to each other into one group and provide a group view thereof in place of single AMO views.

10. The method of claim 1, further comprising determining tilt or mounting errors for the at least first camera device and the at least second camera device based on an evaluation of the coordinate information received from the at least one first camera device with respect to coordinate information generated by the at least one second camera device.

11. The method of claim 1, wherein the threshold minimum detection amount that the first AMO has moved is a user settable motion sensitivity parameter, wherein a higher setting tracks smaller motions than a lower setting of the user settable motion sensitivity parameter.

12. A system for tracking one or more objects using multiple camera devices, comprising:
a first camera device including at least one first processor, a first memory and a first communication device, the at least one first processor being configured:
to process a first video stream, which is captured by the first camera device,
to identify, from among a plurality of actionable motion objects (AMOs), a first actionable motion object (AMO) that has moved a threshold minimum detection amount,
to generate first metadata associated with the first AMO, and
to transmit the first metadata via the first communication device; and
at least one second camera device including at least one second processor, a second memory and a second communication device, the at least one second processor being configured to dynamically control a viewing area of the at least one second camera device in response to the first metadata to enable the at least one second camera device to track and focus on the first AMO;
wherein the first AMO tracked and focused on by the at least one second camera device corresponds to one selected from a group consisting of a fastest moving AMO identified from the AMOs, a farthest AMO from the at least one second camera device which is identified from the AMOs, and a farthest AMO from the at least one first camera device which is identified from the AMOs.

13. The system of claim 12, wherein the first AMO is identified by the first camera device, and the metadata is generated and transmitted by the at least one first camera device.

14. The system of claim 12, wherein the metadata comprises coordinates of the first AMO.

15. The system of claim 12, wherein the at least one first processor is further configured:
to process the first video stream, which is captured by at least one first camera device, to identify a second AMO,
to generate second metadata associated with the second AMO, and
to transmit the second metadata associated with the second AMO to the at least one second camera device, and
wherein the at least one second processor is further configured to dynamically control a viewing area of the at least one second camera device in response to the second metadata to enable the at least one second camera device to track and focus on the first AMO and the second AMO.

16. The system of claim 12, wherein the first AMO tracked and focused on by the at least one second camera device further corresponds to at least one selected from the group consisting of:
a closest AMO to the at least one second camera device which is identified from the AMOs, and
a closest AMO to the at least one first camera device which is identified from the AMOs.

17. The system of claim 12, wherein the at least one second camera device comprises a plurality of the second camera devices, and the first metadata is transmitted to the plurality of the second camera devices, each of the plurality of second camera devices dynamically controlling their respective viewing area in response to the first metadata to enable each of them to track and focus on the first AMO.

18. A non-transitory computer-usable medium storing computer executable code, which when executed by one or more processors of a computer system, is configured to implement a method of tracking one or more objects using multiple camera devices, the method comprising:
receiving or generating metadata associated with a first actionable motion object (AMO), which is identified from a plurality of actionable motion objects in first video stream captured by at least one first camera device, the first AMO having moved a threshold minimum detection amount; and
dynamically controlling a viewing area of the at least one second camera device in response to the first metadata to enable the second camera device to track and focus on the first AMO;
wherein the first AMO tracked and focused on by the at least one second camera device corresponds to one selected from a group consisting of a fastest moving AMO, a farthest AMO from the at least one second camera device, and a farthest AMO from the at least one first camera device.

19. A system for tracking one or more objects using multiple camera devices, comprising:
a first camera device;
at least one second camera device; and
at least one processor configured:
to identify an actionable motion object (AMO) from a video stream captured by the first camera device among a plurality of AMOs, the identified AMO having moved a threshold minimum detection amount,
to generate metadata associated with the AMO, and
to dynamically control a viewing area of the at least one second camera device according to the metadata to enable the at least one second camera device to track and focus on the AMO,
wherein the AMO tracked and focused on by the at least one second camera device corresponds to one selected from a group consisting of a fastest moving AMO, a farthest AMO from the at least one second camera device, and a farthest AMO from the at least one first camera device.

20. A computer-implemented method of tracking one or more objects using multiple camera devices, comprising:

processing a first video stream, which is captured by at least one first camera device, to identify a first actionable motion object (AMO) and a second AMO from among a plurality of AMOs including at least the first AMO and the second AMO;

generating first metadata related to the first AMO based on predetermined criteria met by the first AMO and second metadata related to the second AMO based on predetermined criteria met by the second AMO;

transmitting the first metadata to a second camera device first and then transmitting the second metadata to the second camera device; and dynamically controlling a viewing area of the second camera device in response to the first metadata and second metadata to enable the second camera device to track and focus on both the first AMO and the second AMO, wherein the first AMO and the second AMO tracked and focused on by the second camera device corresponds to a first fastest moving AMO and a second fastest moving AMO, respectively.

\* \* \* \* \*